US012621808B2

(12) United States Patent
Zhang et al.

(10) Patent No.: US 12,621,808 B2
(45) Date of Patent: May 5, 2026

(54) METHOD FOR RESOURCE SELECTION AND FIRST DEVICE

(71) Applicant: GUANGDONG OPPO MOBILE TELECOMMUNICATIONS CORP., LTD., Dongguan (CN)

(72) Inventors: Shichang Zhang, Dongguan (CN); Zhenshan Zhao, Dongguan (CN); Yi Ding, Dongguan (CN); Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 348 days.

(21) Appl. No.: 18/466,698

(22) Filed: Sep. 13, 2023

(65) Prior Publication Data

US 2024/0008001 A1 Jan. 4, 2024

Related U.S. Application Data

(63) Continuation of application No. PCT/CN2021/081789, filed on Mar. 19, 2021.

(51) Int. Cl.
*H04W 72/02* (2009.01)
*H04W 36/00* (2009.01)
(Continued)

(52) U.S. Cl.
CPC ......... *H04W 72/02* (2013.01); *H04W 36/035* (2023.05); *H04W 52/0235* (2013.01); *H04W 72/25* (2023.01); *H04W 72/40* (2023.01)

(58) Field of Classification Search
CPC ..... H04W 72/02; H04W 72/25; H04W 72/40; H04W 52/0235
See application file for complete search history.

(56) References Cited

U.S. PATENT DOCUMENTS

2016/0302250 A1 10/2016 Sheng
2019/0253977 A1* 8/2019 Wang ................. H04W 52/383
(Continued)

FOREIGN PATENT DOCUMENTS

CN 104519577 4/2015
CN 111246483 6/2020
(Continued)

OTHER PUBLICATIONS

LG Electronics, "Feature lead summary for AI 8.11.2.2 Feasibility and benefits for mode 2 enhancements," 3GPP TSG RAN WG1 #103-e, R1-2009788, Oct. 2020.
(Continued)

*Primary Examiner* — Won Tae C Kim
(74) *Attorney, Agent, or Firm* — Hodgson Russ LLP

(57) ABSTRACT

The disclosure provides a method for resource selection and a first device. The method is applied to a first device and includes the following. A first signaling is transmitted to a second device, where the first signaling is used to trigger the second device to transmit a resource set to the first device, and the resource set is used to assist the first device in sidelink (SL) transmission resource selection. The resource set is received from the second device. A resource for SL transmission is selected according to the resource set.

18 Claims, 9 Drawing Sheets

(51) Int. Cl.
　　*H04W 52/02*　　(2009.01)
　　*H04W 72/25*　　(2023.01)
　　*H04W 72/40*　　(2023.01)

(56)　　　　　References Cited

U.S. PATENT DOCUMENTS

| | | | | |
|---|---|---|---|---|
| 2022/0322359 | A1* | 10/2022 | Ye | H04W 72/02 |
| 2023/0143979 | A1 | 5/2023 | Luo et al. | |
| 2023/0164875 | A1* | 5/2023 | Lee | H04W 76/23 |
| | | | | 370/329 |
| 2023/0262737 | A1* | 8/2023 | Wang | H04W 72/25 |
| | | | | 370/329 |
| 2023/0262774 | A1* | 8/2023 | Wu | H04W 76/14 |
| | | | | 370/329 |
| 2023/0371005 | A1* | 11/2023 | Cai | H04W 72/02 |
| 2023/0380005 | A1* | 11/2023 | Ko | H04W 72/25 |
| 2024/0080937 | A1* | 3/2024 | Park | H04L 1/1864 |

FOREIGN PATENT DOCUMENTS

| | | |
|---|---|---|
| CN | 111901783 | 11/2020 |
| CN | 112399644 | 2/2021 |
| CN | 112512102 | 3/2021 |

OTHER PUBLICATIONS

Huawei et al., "Inter-UE coordination in sidelink resource allocation," 3GPP TSG RAN WG1 Meeting #103-e, R1-2007616, Oct. 2020.

Samsung, "On Feasibility and Benefits for Mode2 Enhancements," 3GPP TSG RAN WG1 #103-e, R1-2008190, Oct. 2020.

Ericsson, "Feasibility and benefits of mode 2 enhancements for inter-UE coordination," 3GPP TSG-RAN WG1 Meeting #103-e, R1-2009073, Aug. 2020.

Qualcomm Incorporated, "Reliability and Latency Enhancements for Mode 2," 3GPP TSG RAN WG1 Meeting #103-e, R1-2009273, Oct. 2020.

VIVO, "Discussion on mode 2 enhancements," 3GPP TSG RAN WG1 #103-e, R1-2007689, Oct. 2020.

LG Electronics, "Discussion on feasibility and benefits for mode 2 enhancement," 3GPP TSG RAN WG1 Meeting #103-e, R1-2007896, Oct. 2020.

Apple, "Discussion on Inter-UE Coordination for Mode 2 Resource Allocation," 3GPP TSG RAN WG1 #103-e, R1-2008447, Oct. 2020.

WIPO, International Search Report and Written Opinion for International Application No. PCT/CN2021/081789, Dec. 15, 2021.

Convida Wireless, "On NR Sidelink Resource Allocation Mode 2 Enhancement," 3GPP TSG RAN WG1 Meeting #104-e, R1-2101423, Jan. 2021.

Ericsson, "DRX for sidelink communications," 3GPP TSG-RAN WG2 Meeting #112-e, R2-2009231, Nov. 2020.

Qualcomm Incorporated, "Sidelink Resource Allocation Mode 2," 3GPP TSG RAN WG1 Meeting #101-e, R1-2004452, May 2020.

VIVO, "Resource allocation for sidelink power saving," 3GPP TSG RAN WG1 #104-e, R1-2101790, Jan. 2021.

"3rd Generation Partnership Project; Technical Specification Group Radio Access Network; NR; Medium Access Control (MAC) protocol specification (Release 16)," 3GPP TS 38.321, Dec. 2020, v16.3.0.

EPO, Extended European Search Report for EP Application No. 21930874.9, Mar. 14, 2024.

* cited by examiner

METHOD FOR RESOURCE SELECTION AND FIRST DEVICE

CROSS REFERENCE TO RELATED APPLICATION(S)

This application is a continuation of International Application No. PCT/CN2021/081789, filed Mar. 19, 2021, the entire disclosure of which is incorporated herein by reference.

TECHNICAL FIELD

Implementations of the disclosure relate to the field of wireless communication technologies, and more particularly, to a method for resource selection and a first device.

BACKGROUND

As a key technology for 5th generation (5G) mobile networks, device-to-device (D2D) communication includes vehicle-to-vehicle (V2V) communication or vehicle-to-everything (V2X) communication. Sidelink (SL) transmission technologies are introduced in D2D communication. Different from receiving and transmitting communication data via a base station in traditional cellular systems, D2D communication adopts terminal-to-terminal direct communication and thus has a higher spectral efficiency and a lower transmission delay.

At present, the 3rd generation partnership project (3GPP) defines two transmission modes in V2X technologies. In one transmission mode, the terminal transmits data on an SL according to a resource allocated by the base station, where the base station can allocate to the terminal a resource for single transmission or a resource for semi-static transmission. In the other transmission mode, the terminal determines a candidate resource set according to an existing listening process, and then autonomously selects a resource for SL transmission from the candidate resource set.

In the second transmission mode, there are problems such as hidden terminals and half-duplex constraints. To solve these problems, an enhanced resource selection scheme is proposed. In the enhanced resource selection scheme, on the basis of resource listening in the second transmission mode, one terminal (UE-A) may transmit a resource set to another terminal (UE-B) to assist UE-B in resource selection. In addition, in the second transmission mode, the terminal needs to continuously listen resources in the listening process to determine which resources are available, which results in excessive power consumption of the terminal. For energy saving, a discontinuous reception (DRX) mechanism is considered to be introduced in an SL system.

With the introduction of the SL DRX mechanism, for the enhanced resource selection scheme, when a terminal transmits data or a signaling to another terminal, the other terminal may be in the sleep state, which may affect the transmission performance of the whole system, and may also cause the terminal to be unable to considering resource sets of other terminals in resource selection. Therefore, it is necessary to further optimize the enhanced resource selection scheme.

SUMMARY

In a first aspect, a method for resource selection is provided. The method is applied to a first device and includes the following. A first signaling is transmitted to a second device, where the first signaling is used to trigger the second device to transmit a resource set to the first device, and the resource set is used to assist the first device in sidelink (SL) transmission resource selection. The resource set is received from the second device. A resource for SL transmission is selected according to the resource set.

In a second aspect, a method for resource selection is provided. The method is applied to a second device and includes the following. A first signaling is received from a first device in a discontinuous reception (DRX) active time for the second device, where the first signaling is used to trigger the second device to transmit a resource set to the first device, and the resource set is used to assist the first device in SL transmission resource selection. The resource set is transmitted to the first device according to the first signaling.

In a third aspect, a first device is provided. The first device includes a processor, a transceiver, and a memory configured to store computer programs. The processor is configured to invoke and execute the computer programs stored in the memory to: cause the transceiver to transmit a first signaling to a second device, where the first signaling is used to trigger the second device to transmit a resource set to the first device, and the resource set is used to assist the first device in SL transmission resource selection, cause the transceiver to receive the resource set from the second device, and select a resource for SL transmission according to the resource set.

Other features and aspects of the disclosed features will become apparent from the following detailed description, taken in conjunction with the accompanying drawings, which illustrate, by way of example, the features in accordance with implementations of the disclosure. The summary is not intended to limit the scope of any implementations described herein.

DETAILED DESCRIPTION

To make the purpose, technical solutions, and advantages of implementations of the disclosure clearer, the following will clearly and completely describe technical solutions of implementations of the disclosure with reference to the accompanying drawings. Apparently, implementations described herein are merely some implementations, rather than all implementations, of the disclosure. Based on implementations of the disclosure, all other implementations obtained by those of ordinary skill in the art without creative effort shall fall in the protection scope of the disclosure.

The terms "include", "have", and any variations thereof in the specification, claims, and accompanying drawings of the disclosure are intended to cover non-exclusive inclusion. For example, a process, a method, a system, a product, or a device including a series of steps or units are not to be limited to those steps or units clearly listed, but may include other steps or units not clearly listed or inherent to the process, the method, the product, or the device.

It should be understood that, the "indication" mentioned in implementations of the disclosure may be a direct indication or an indirect indication, or indicate an association. For example, if A indicates B, it can mean that A directly indicates B, for example, B can be obtained through A, or mean that A indicates B indirectly, for example, A indicates C, and B can be obtained through C, or it can also mean that there is an association between A and B.

In the description of implementations of the disclosure, the term "corresponding" can mean that there is a direct or indirect correspondence between two elements, or that there is an association between two elements, or that there is a relationship of "indicating" and "being indicated", "configuring" and "being configured", and the like.

Before introducing the technical solutions provided in implementations of the disclosure, possible application scenarios of implementations of the disclosure are described.

Figures 1, 2, 3:
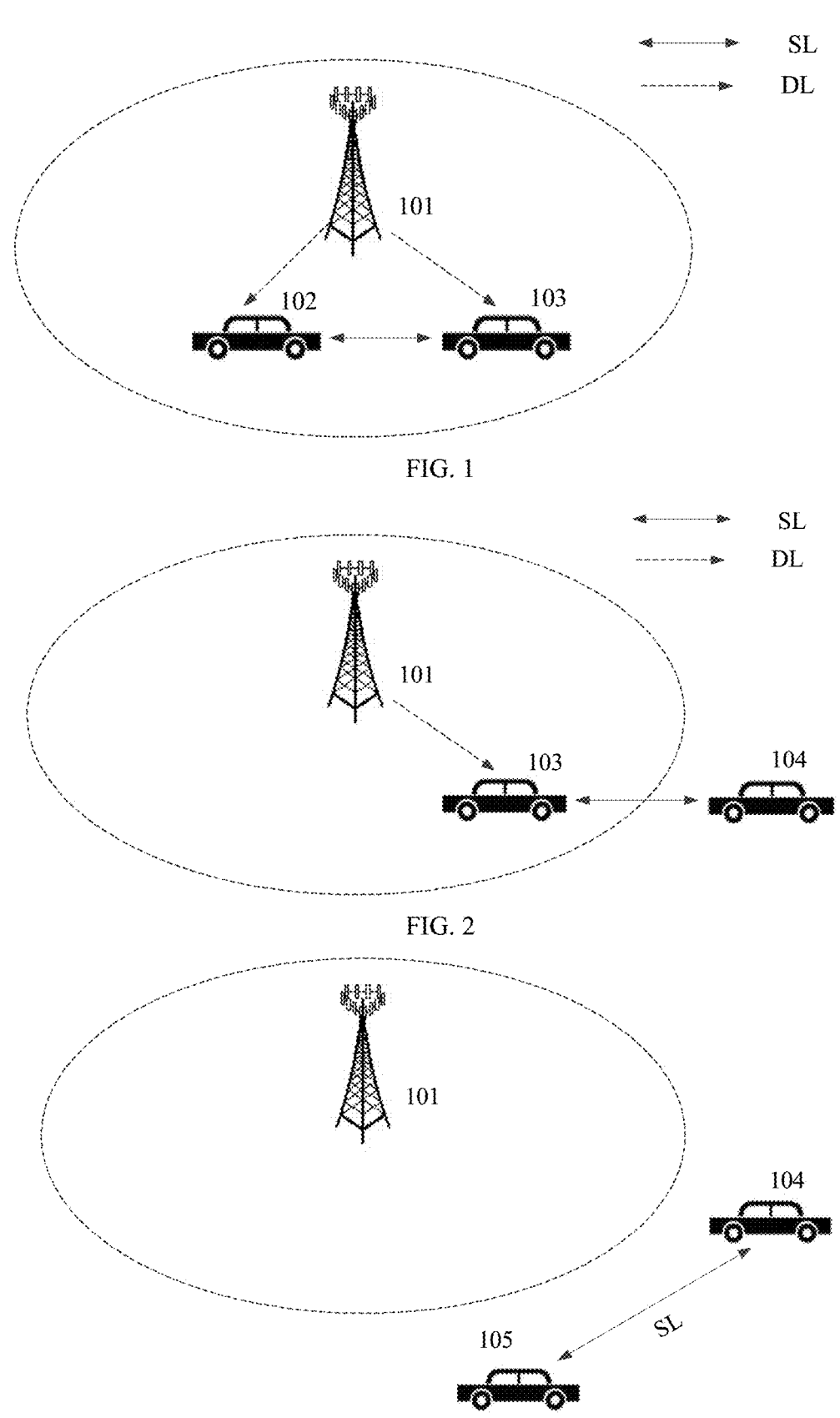
FIG. 1 is a first schematic diagram illustrating an application scenario provided in implementations of the disclosure.
FIG. 2 is a second schematic diagram illustrating an application scenario provided in implementations of the disclosure.
FIG. 3 is a third schematic diagram illustrating an application scenario provided in implementations of the disclosure.

Exemplarily, FIG. 1 is a schematic diagram illustrating an application scenario provided in implementations of the disclosure. The communication system illustrated in FIG. 1 includes a network device 101 and two terminal devices, i.e., terminal devices 102 and 103. The terminal device 102 and the terminal device 103 both are in the coverage of the network device 101. The network device 101 is in communication connection with the terminal device 102 and the terminal device 103 respectively. The terminal device 102 is in communication connection with the terminal device 103. Exemplarily, the terminal device 102 may transmit a communication message to the terminal device 103 via the network device 10 or transmit the communication message to the terminal device 103 directly. A direct communication link between the terminal device 102 and the terminal device 103 is referred to as a device-to-device (D2D) link, or may also be referred to as a proximity service (ProSe) link, an SL, etc. Transmission resources on the D2D link may be allocated by the network device.

Exemplarily, FIG. 2 is a schematic diagram illustrating another application scenario provided in implementations of the disclosure. The communication system illustrated in FIG. 2 also includes a network device 101 and two terminal devices. Different from FIG. 1, the terminal device 103 is in the coverage of the network device 101, but the terminal device 104 is out of the coverage of the network device 101. The network device 101 is in communication connection with the terminal device 103. The terminal device 103 is in communication connection with the terminal device 104. Exemplarily, the terminal device 103 can receive configuration information transmitted by the network device 101 and perform SL communication according to the configuration information. Since the terminal device 104 cannot receive the configuration information transmitted by the network device 101, the terminal device 104 can perform SL communication according to pre-configuration information and information carried in a physical sidelink broadcast channel (PSBCH) transmitted by the terminal device 103.

Exemplarily, FIG. 3 is a schematic diagram illustrating another application scenario provided in implementations of the disclosure. As illustrated in FIG. 3, the terminal device 104 and the terminal device 105 are both out of the coverage of the network device 101. The terminal device 104 and the terminal device 105 can determine SL configuration for SL communication according to the pre-configuration information.

For SL communication, two transmission modes, i.e., a first transmission mode and a second transmission mode are defined in the 3GPP protocol.

The first transmission mode is as follows. A transmission resource of the terminal device is allocated by the base station, and the terminal device transmits data on an SL according to the resource allocated by the base station, where the base station can allocate to the terminal device a resource for single transmission or a resource for semi-static transmission.

Exemplarily, in FIG. 1, the terminal device 102 is in the coverage of the network device 101, and the network device 101 allocates a transmission resource for SL transmission to the terminal device 102.

The second transmission mode is as follows. (1) If the terminal device has a listening capability, the terminal device may transmit data through listening and reservation or by randomly selecting a resource. Specifically, the listening and reservation means that the terminal device can obtain an available resource set by listening from a resource pool configured or pre-configured by the network, and randomly select a resource for data transmission from the available resource set; and (2) if the terminal device does not have the listening capability, the terminal device can select a transmission resource randomly from the resource pool.

The listening means that the terminal device receives first sidelink control information (SCI) transmitted by another terminal device, learns resources reserved by the other terminal device according to an indication in the first SCI, and excludes the resources reserved by the other terminal device during resource selection to avoid resource conflicts with the other terminal device.

Exemplarily, the terminal device 102 illustrated in FIG. 1 can autonomously select a transmission resource for SL transmission from the resource pool configured by the network. The terminal device 104 and the terminal device 105 illustrated in FIG. 3 are out of the coverage of the network device 101 and can autonomously select transmission resources for SL transmission from the pre-configured resource pool.

As can be seen from the above, in the second transmission mode, the terminal device can perform resource selection according to a listening result. Specifically, when new data arrives at moment n, the terminal device may perform resource selection in a resource selection window according to a listening result of a predefined time period before moment n.

Figure 4:
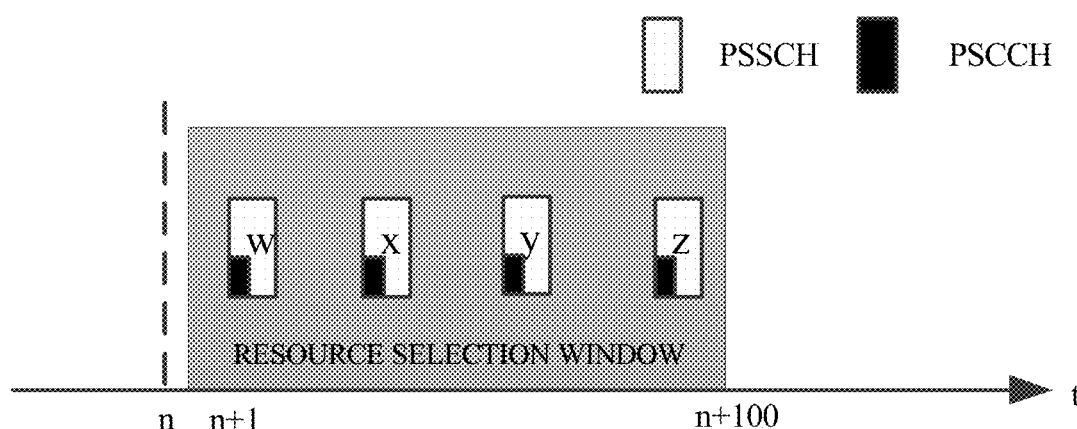
FIG. 4 is a schematic diagram illustrating resources for resource selection provided in implementations of the disclosure.

Exemplarily, FIG. 4 is a schematic diagram illustrating resources for resource selection provided in implementations of the disclosure. As illustrated in FIG. 4, when service data arrives at moment n, the terminal device randomly selects a resource in a resource selection window $[n+T_1, n+T_2]$ corresponding to moment n. For example, four resources, i.e., resources w, x, y, and z are selected. $T_1=1$, and $T_2=100$, where $0 \leq T_1 \leq T_{proc,1}$, $T_{proc,1}$ is determined according to a processing capability of the terminal device, $T_{2min} \leq T_2 \leq$ remaining packet delay budget (PDB), $T_{2min}$ is determined according to a configuration parameter, and the PDB is determined according to a delay of data to be transmitted, for example.

Specifically, the terminal device selects a resource in the resource selection window $[n+T_1, n+T_2]$ as follows.

Step 0. The terminal device determines all available resources in the resource selection window as set A.

Step 1. If the terminal device has no listening result for some slots in the listening window due to half-duplex problems, the terminal device excludes resources in corresponding slots in the resource selection window for these slots.

Step 2. If the terminal device detects a physical sidelink control channel (PSCCH) in a listening window, the terminal device measures a reference signal received power (RSRP) of the PSCCH or a RSRP of a physical sidelink shared channel (PSSCH) scheduled by the PSCCH. If the measured RSRP is greater than a RSRP threshold and there is a resource conflict between a transmission resource reserved in a SCI of the PSCCH/PSSCH and SL data to be transmitted by the terminal device, the terminal device excludes that resource from set A. The PSSCH-RSRP threshold is selected according to priority information carried in the detected PSCCH and a priority of the data to be transmitted by the terminal device.

Step 3. If the number of remaining resources in set A is less than X % of the total number of resources in set A, the terminal device increases the RSRP threshold by 3 dB and repeats the above steps until the number of remaining resources in set A is greater than X % of the total number of resources in set A. X is a higher-layer configured parameter. For example, X=20, 30, or 50. The value of X is determined according to the priority of the data to be transmitted by the terminal device.

Step 4. The terminal device reports the determined set A, i.e., a candidate resource set (or referred to as an available resource set) to the higher layer, and the higher layer randomly selects a transmission resource for SL transmission from the candidate resource set reported by the physical layer.

The terminal device involved in implementations of the disclosure may also be referred to as a terminal, which may be a device with wireless transmission and reception functions. The terminal device can be deployed on land, which includes indoor or outdoor, handheld, or in-vehicle. The terminal device can also be deployed on water, for example, on a ship, etc. The terminal device may also be deployed in the air, for example, on an airplane, an air balloon, a satellite, etc. The terminal device may be a user equipment (UE), where the UE includes a handheld device, a vehicle-mounted device, a wearable device, or a computing device with wireless communication functions. Exemplarily, the UE may be a mobile phone, a tablet computer, or a computer with wireless transmission and reception functions. The terminal device can also be a virtual reality (VR) terminal device, an augmented reality (AR) terminal device, a wireless terminal in industrial control, a wireless terminal in self driving, a wireless terminal in remote medical, a wireless terminal in smart grid, a wireless terminal in smart city, a wireless terminal in smart home, etc. In implementations of the disclosure, an apparatus for implementing functions of the terminal may be a terminal, or an apparatus capable of supporting the terminal to implement the functions, such as a chip system. The apparatus may be installed in the terminal. In implementations of the disclosure, the chip system may consist of a chip, or may include a chip and other discrete devices.

The network device involved in implementations of the disclosure includes a base station (BS), which may be a device deployed in a wireless access network and capable of communicating wirelessly with the terminal. The base station may have various forms, such as a macro base station, a micro base station, a relay station, an access point, etc. Exemplarily, the base station involved in implementations of the disclosure may be a base station in 5th generation (5G) or a base station in long-term evolution (LTE). The base station in 5G may also be referred to as a transmission reception point (TRP) or a gNB. In implementations of the disclosure, an apparatus for implementing functions of the network device may be a network device, or an apparatus capable of supporting the network device to implement the functions, such as a chip system. The apparatus may be installed in the network device.

The technical solutions of implementations of the disclosure are mainly applied to a communication system based on new radio (NR) technologies, such as a 5G communication system, an NR-V2X communication system, an NR-V2V communication system, etc. The technical solutions can also be applied to other communication systems, as long as there is resource scheduling between entities in the communication system. For example, the technical solutions can be applied to resource scheduling between the network device and the terminal device, or resource scheduling between two terminal devices where one terminal device is responsible for accessing the network, etc.

It should be noted that, the system architecture and the application scenario described in implementations of the disclosure are for illustrating the technical solutions of implementations of the disclosure more clearly, and do not constitute a limitation to the technical solutions provided in implementations of the disclosure. It is known to those of ordinary skill in the art that, with the evolution of the network architecture and the emergence of new service scenarios, the technical solutions provided in implementations of the disclosure are also applicable to similar problems.

In NR-V2X communication, X can generally refer to any device with wireless transmission and reception capabilities, including but not limited to a slow-moving wireless apparatus, a fast-moving vehicle-mounted device, a network control node with wireless transmitting and receiving capabilities, etc. NR-V2X communication supports unicast transmission, multicast transmission, and broadcast transmission. For unicast transmission, a transmitting terminal transmits data, and there is only one receiving terminal. For multicast transmission, a transmitting terminal transmits data, and all terminals in a communication group or all terminals in a certain transmission distance are receiving terminals. For broadcast transmission, a transmitting terminal transmits data, and any terminal around the transmitting terminal is a receiving terminal.

Figure 5:
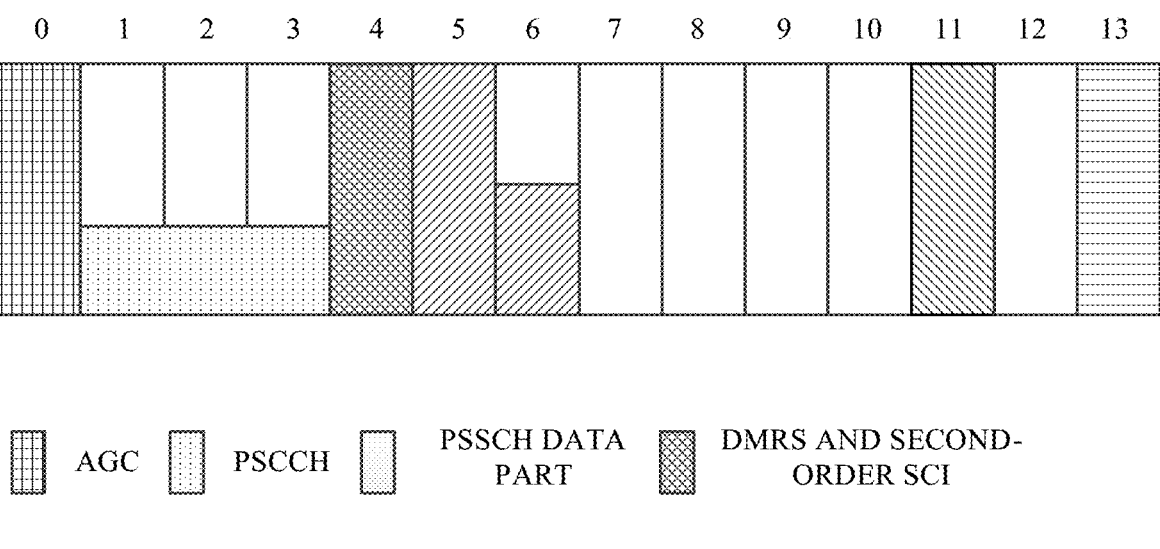
FIG. 5 is a schematic diagram illustrating a frame structure of sidelink (SL) communication provided in implementations of the disclosure.

In NR-V2X communication, a second-order SCI is introduced. A first-order SCI (or referred to as first SCI) is carried in a PSCCH and indicates a transmission resource, a reserved resource, a modulation and coding scheme (MCS) level, a priority, and other information of a PSSCH. The second-order SCI (or referred to as second SCI) is carried in the PSSCH and indicates a transmitter identification (ID), a receiver ID, a hybrid automatic repeat request (HARQ) ID, a new data indication (NDI), and other information used for data demodulation. The terminal device performs demodulation with a demodulation reference signal (DMRS) of the PSSCH. The second-order SCI is mapped from a first DMRS symbol of the PSSCH, first in the frequency domain and then in the time domain. Exemplarily, FIG. 5 is a schematic diagram illustrating a frame structure of SL communication provided in implementations of the disclosure. As illustrated in FIG. 5, the PSCCH occupies 3 symbols, such as symbols 1, 2, and 3 in FIG. 5, and the DMRS of the PSSCH occupies symbols 4 and 11. The second-order SCI is mapped from symbol 4 and is frequency division multiplexed with the DMRS on symbol 4. The second-order SCI is mapped to symbols 4, 5, and 6. The size of a resource occupied by the second-order SCI depends on the number of bits of the second-order SCI.

In the second transmission mode, the terminal device randomly selects a transmission resource from a resource pool or selects a transmission resource according to a listening result. With this resource selection manner, interference between terminal devices can be avoided to a certain extent, but there are still the following problems.

Figure 6:
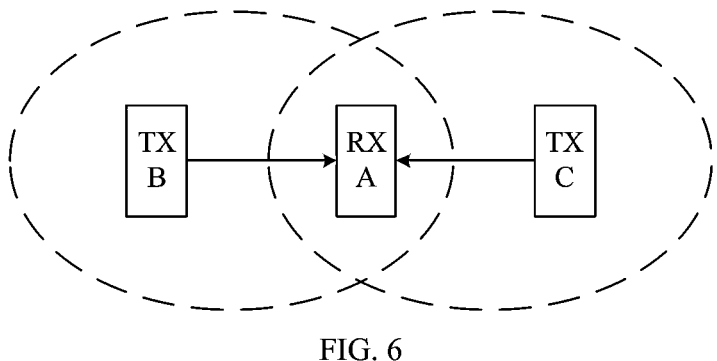
FIG. 6 is a schematic diagram illustrating a hidden node scenario.

First, a hidden node problem. FIG. 6 is a schematic diagram illustrating a hidden node scenario. As illustrated in FIG. 6, a transmitting terminal TX B selects a resource based on listening and transmits SL data to a receiving terminal RX A in the resource. Since TX B and a transmitting terminal TX C are far away from each other and cannot listen a transmission from each other, TX B and TX C may select a same transmission resource, and data transmitted by TX C will interfere with data transmitted by TX B.

Second, a half-duplex problem. When a terminal selects a transmission resource based on listening, in a listening window, if the terminal transmits SL data in a slot, due to a half-duplex constraint, the terminal cannot receive data transmitted by other terminals in the slot and there is no listening result in the slot. Therefore, during resource exclusion, the terminal will exclude all resources corresponding to the slot in the selection window to avoid interference with other terminals. Due to the half-duplex constraint, the terminal excludes many resources that do not need to be excluded.

Figure 7:
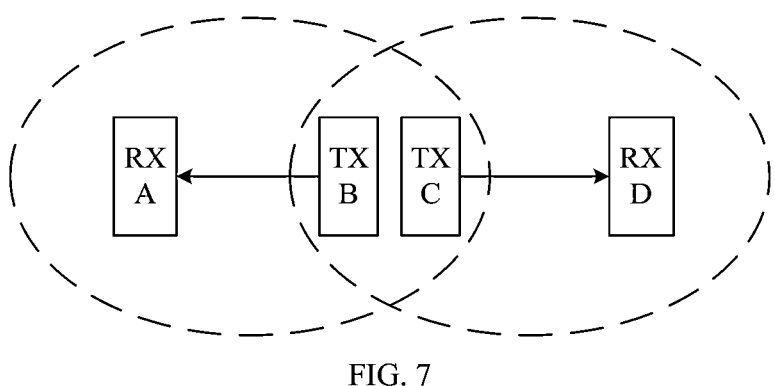
FIG. 7 is a schematic diagram illustrating an exposed terminal scenario.

Third, an exposed terminal problem. FIG. 7 is a schematic diagram illustrating an exposed terminal scenario. As illustrated in FIG. 7, the transmitting terminal TX B and the transmitting terminal TX C both can listen to each other, while the target receiving terminal RX A of TX B is far away from TX C, and the target receiving terminal RX D of TX C is far away from TX B. In this case, even if TX B and TX C use a same time-frequency resource, reception of their respective target receiving terminals will not be affected. However, since TX B is geographically close to TX C, a signal reception power of one terminal detected by the other terminal in the listening process may be high. Therefore, a time-frequency resource selected by one terminal may be orthogonal to a time-frequency resource selected by the other terminal, which may eventually lead to a decrease in the resource utilization efficiency.

Fourth, a power consumption problem. The terminal needs to continuously listen to resources in the listening process to determine which resources are available, and the continuous resource listening by the terminal consumes a lot of power. This not a problem for a vehicle-mounted terminal because the vehicle-mounted terminal has a power supply device. However, for a handheld terminal, excessive power consumption will cause the terminal to run out of power soon. Therefore, how to reduce the power consumption of the terminal is also a problem to be considered for resource selection.

Due to the above-mentioned problems for resource selection in the second transmission mode, an enhanced resource selection scheme is proposed. On the basis of resource listening in the second transmission mode, one terminal (UE-A) may transmit a resource set to another terminal (UE-B) to assist UE-B in resource selection. This resource set can be of two different types as follows.

(1) Reference resource set: UE-A can obtain an available resource set according to a resource listening result, an indication from a base station, etc., and transmit the resource set to UE-B. The resource set can be a resource set suitable for UE-B. When selecting a resource for transmitting SL data to a target receiving terminal, UE-B can preferentially select a resource from the available resource set, thereby improving the reliability of reception of the SL data at the target receiving terminal. Alternatively, the resource set can be a resource set unsuitable for UE-B, and UE-B can avoid selecting a resource from the resource set when selecting a resource, thereby avoiding problems such as a hidden terminal, a half-duplex constraint, etc. In some cases, UE-A needs to determine a time or a time range to transmit the resource set to UE-B according to a signaling indication transmitted by UE-B, thereby ensuring that the resource set transmitted by UE-A can be used for UE-B to perform resource selection or reselection.

(2) Allocated transmission resources: information transmitted by UE-A to UE-B contains a transmission resource directly allocated to UE-B, and UE-B transmits SL data to the target receiving terminal in the transmission resource, which is equivalent to UE-A allocating an SL transmission resource to UE-B.

Compared with the current second transmission mode in which the terminal autonomously selects a transmission resource, in the above resource allocation manner, the terminal needs to consider a resource set transmitted by another terminal in resource selection, thereby improving the transmission reliability.

In a wireless network, when there is data to be transmitted, the UE needs to continuously listen to a physical downlink control channel (PDCCH), and transmits and receives data according to an indication message transmitted from the network side, which results in large power consumption and a large data transmission delay of the UE. Therefore, a discontinuous reception (DRX) mechanism is introduced in the 3GPP standard protocol to save energy.

Figure 8:
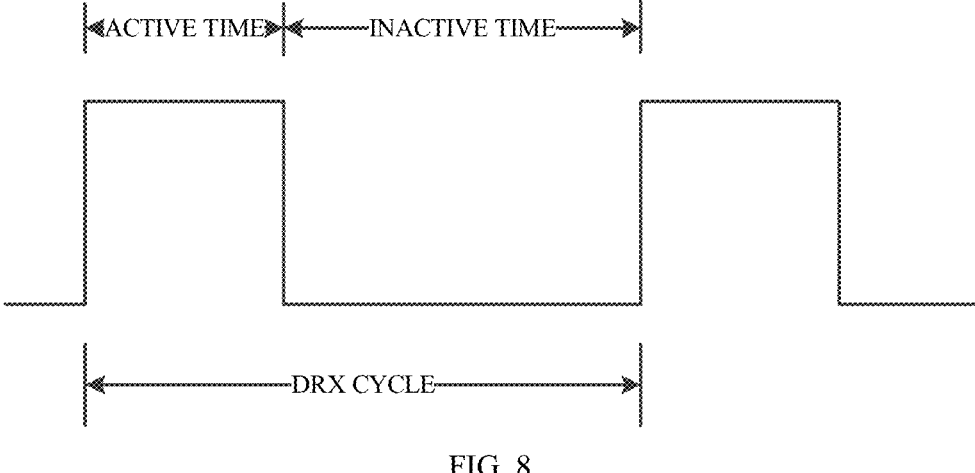
FIG. 8 is a schematic diagram illustrating a discontinuous reception (DRX) mechanism.

FIG. 8 is a schematic diagram illustrating a DRX mechanism. As illustrated in FIG. 8, a basic mechanism of DRX is to configure a DRX cycle for a UE in RRC_CONNECTED state. The DRX cycle consists of a "on duration" and a "opportunity for DRX". During the "on duration" (also referred to as active time), the UE listens and receives a PDCCH. During the "opportunity for DRX" (also referred to as inactive time), the UE does not receive a PDCCH, so as to reduce power consumption. Compared with the "DRX on duration", the opportunity for DRX can also be referred to as "DRX off duration".

In DRX operation, the terminal controls the active time and the inactive time for the terminal according to some timer parameters configured by the network. For example, when receiving from the network a PDCCH for scheduling the UE during the on duration, the UE activates a timer, such as drx_inactiveTimer and remains active until the timer expires.

In R17 SL technologies, a mechanism for saving energy and reducing power consumption of the terminal is discussed. For energy saving, the introduction of the DRX mechanism in SL, i.e., SL DRX is considered. Similar to the DRX mechanism of Uu interface, the terminal receives data transmitted by other terminals in the on duration. If no data is detected, the terminal enters a sleep state in the DRX off duration to save power. If data transmitted by other terminals is detected, the terminal activates the timer and remains active until the timer expires.

With the introduction of the SL DRX mechanism, there may be the following problem in the enhanced resource selection scheme. UE-A transmits a resource set to UE-B. If UE-B is configured with DRX, UE-B may be in the sleep state and cannot receive the resource set from UE-A. As a result, UE-B will not be able to select a transmission resource considering resource sets of other terminals.

In view of the above problem, implementations of the disclosure propose a method for resource selection. Considering that UE-B receiving the resource set may be configured with DRX, UE-A will feed back the resource set to UE-B in the DRX active time for UE-B, thereby avoiding that UE-B is in the sleep state when the resource set is transmitted to UE-B. The above method is an optimization of the enhanced resource selection scheme, which can improve the overall performance of the SL communication system.

The technical solutions provided in implementations of the disclosure are described in detail below with specific implementations. It should be noted that the technical solutions provided in implementations of the disclosure may include some or all of the following, and these specific implementations below may be combined with each other, and the same or similar concepts or processes will not be repeated in some implementations.

Figure 9:
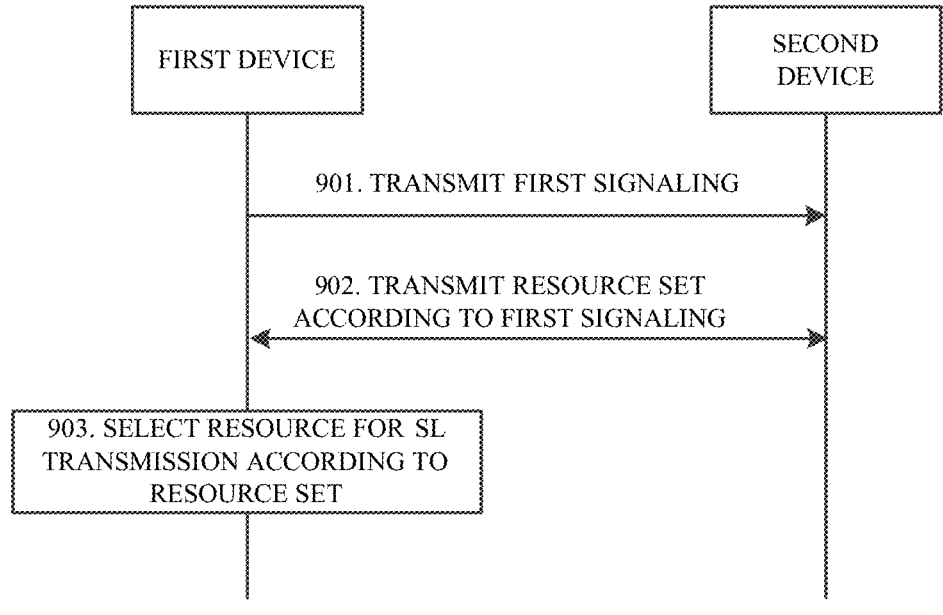
FIG. 9 is an interactive schematic diagram illustrating a method for resource selection provided in implementations of the disclosure.

Exemplarily, FIG. 9 is an interactive schematic diagram illustrating a method for resource selection provided in implementations of the disclosure. As illustrated in FIG. 9, a first device and a second device are any two devices in SL communication. The method for resource selection in implementations includes the following steps.

Step 901. The first device transmits a first signaling to the second device.

The first signaling is used to trigger the second device to transmit a resource set to the first device, and the resource set is used to assist the first device in SL transmission resource selection. The resource set is a reference resource set transmitted by the second device to the first device, and the first device can perform SL transmission resource selection in combination with the reference resource set on the basis of the existing resource selection scheme.

In implementations, the first signaling transmitted by the first device to the second device may be carried in a specific bit field of a PSCCH, a medium access control-control element (MAC CE) in a PSSCH, a second SCI, or a PC5 radio resource control (RRC).

In implementations of the disclosure, the first device may transmit the first signaling to the second device when a predefined condition is satisfied. Specifically, the predefined condition includes at least one of the following conditions.

(1) The first device has triggered or is about to trigger resource reselection.

The first device being about to trigger resource reselection includes the following cases.

In case 1, an SL process of the first device is used for multiple MAC protocol data unit (PDU) transmissions, the value of a resource occupancy counter SL_RE-SOURCE_RESELECTION_COUNTER is equal to 1, and the value of a random number randomly generated by the first device in [0, 1] is greater than a parameter sl-ProbResourceKeep configured by the higher layer. In this case, the first device will perform resource reselection after a next transmission, i.e., after the resource occupancy counter returns to zero.

In case 2, the SL process of the first device is used for multiple MAC PDU transmissions, but in the past one second, the first device has not used a reserved resource for any initial transmission or retransmission. In this case, the first device will perform resource reselection when there is SL data in the logical channel of the first device.

In case 3, the SL process of the first device is used for multiple MAC PDU transmissions, and no information is transmitted by the first device on consecutive sl-ReselectAfter reserved resources, where sl-ReselectAfter is a higher-layer configured parameter. In this case, the first device will perform resource reselection when there is SL data in the logical channel of the first device.

In case 4, if the first device currently has an SL grant resource, but even if the first device adopts a maximum MCS resource currently allowed by the higher layer, the maximum MCS resource cannot carry a current RLC PDU, and a MAC layer of the first device does not further divide the RLC PDU. In this case, the first device will perform resource reselection.

(2) A priority of SL data to be transmitted by the first device is greater than a priority threshold. The priority threshold is configured or pre-configured by the network, or defined in standards.

(3) The first device determines that the number of consecutive reception failures of a PSSCH by the second device from the first device is greater than a predefined number. Specifically, there are the following two cases.

In case 1, the second device feeds back an acknowledgement (ACK) message when successfully receiving a PSSCH transmitted by the first device, or feeds back a non-acknowledgement (NACK) message when successfully receiving a PSCCH transmitted by the first device but failing to receive the PSSCH transmitted by the first device. The number of consecutive reception failures of an ACK feedback by the first device from the second device is greater than a specific threshold, where the specific threshold is configured or pre-configured by the network, or defined in standards.

In case 2, the second device feeds back a NACK message when successfully receiving a PSCCH transmitted by the first device but failing to receive a PSSCH transmitted by the first device, or otherwise, the second device does not provide any feedback. The number of consecutive reception failures of a NACK feedback by the first device from the second device is greater than a specific threshold, where the specific threshold is configured or pre-configured by the network, or defined in standards.

(4) A delay of the SL data to be transmitted by the first device is greater than a delay threshold.

Step 902. The second device transmits a resource set to the first device according to the first signaling.

In implementations of the disclosure, the resource set transmitted by the second device specifically includes a resource suitable or unsuitable SL transmission by the first device.

In implementations of the disclosure, upon receiving the first signaling, the second device transmits the resource set to the first device in response to the first signaling.

Exemplarily, according to the trigger of the first signaling, the second device transmits the resource set to the first device in a first time unit. The resource set includes a resource suitable or unsuitable SL transmission by the first device in a predefined time period after the first time unit. The first time unit may be a radio frame, a subframe, a slot, a symbol, or a half frame.

For example, the first time unit is a slot, and the second device may transmit the resource set according to the following implementations.

In possible implementations, the second device transmits the resource set in slot m. The resource set includes A1 resources unsuitable for the first device in [m+T0, m+PDB], where A1≥1. T0 indicates a minimum time required for the first device to receive the resource set transmitted by the second device and response to the resource set. The value of T0 may be configured or pre-configured by the base station, or defined in standards. PDB is a remaining tolerable delay of data to be transmitted by the first device.

Optionally, in some implementations, B1 resources among the A1 resources are also included in M resources indicated by a PSSCH carrying the first signaling, where 1≤B1≤A1. Accordingly, the first device needs to reselect B1 resources, i.e., select different resources to replace the original B1 resources. During the resource reselection, the first device needs to exclude the A1 resources in the resource set.

In possible implementations, the second device transmits the resource set in slot m. The resource set includes A2 resources suitable for the first device in [m+T0, m+PDB], where A2≥1.

In possible implementations, the second device transmits the resource set in slot m. The resource set includes A1 resources unsuitable for the first device and A2 resources suitable for the first device in [m+T0, m+PDB].

In possible implementations, the second device transmits the resource set in slot m. The resource set includes A3 resources unsuitable for the first device in [m+T0, m+Δ], where A3≥1. T0 indicates a minimum time required for the first device to receive the resource set transmitted by the second device and response to the resource set. The value of T0 may be configured or pre-configured by the base station, or defined in standards. Δ is a specific time span. The value of Δ may be configured by the base station, configured or pre-configured by the first device, or defined in standards. Optionally, the value of Δ may be associated with a data priority indicated in the PSCCH.

Optionally, in some implementations, B2 resources among the A3 resources are also included in M retransmission resources indicated by the PSCCH carrying the first signaling, where 1≤B2≤A3. Accordingly, the first device needs to reselect B2 resources, i.e., select different resources to replace the original B2 resources. During the resource reselection, the first device needs to exclude the A3 resources in the resource set.

In possible implementations, the second device transmits the resource set in slot m. The resource set includes A4 resources suitable for the first device in [m+T0, m+Δ], where A4≥1.

In possible implementations, the second device transmits the resource set in slot m. The resource set includes A3 resources unsuitable for the first device and A4 resources suitable for the first device in [m+T0, m+Δ].

In above implementations, the second device transmits the resource set in slot m. If the first device is configured with DRX, the first device needs to notify the second device of a DRX configuration of the first device, and the second device needs to ensure that slot m is in the DRX active time for the first device. The DRX active time for the first device includes the on duration in one or more DRX configurations semi-statically configured by the first device, and a time range from activation to deactivation of a timer activated at the first device by the second device via an SL transmission that has been transmitted or is to be transmitted to the first device. It should be understood that the first device needs to transmit a current DRX configuration of the first device to the second device in advance.

In implementations of the disclosure, the first signaling includes at least one of: a transmission resource pool of the first device; a priority prio_TX of SL data to be transmitted by the first device; a start and an end of a resource selection window for resource selection to be performed by the first device; a delay requirement of the SL data to be transmitted by the first device; a frequency-domain resource size L_subCH adopted in the resource selection to be performed by the first device; or a resource reservation period P_rsvp_TX adopted in the resource selection to be performed by the first device. Upon receiving the first signaling, the second device determines the resource set according to the content indicated by the first signaling and transmits the resource set to the first device.

Exemplarily, the second device determines a resource suitable or unsuitable SL transmission by the first device in the resource selection window according to the resource selection window indicated in the first signaling.

In implementations of the disclosure, the first signaling includes at least one of: a transmission resource pool of the first device; M resources selected by the first device, where M is a positive integer greater than or equal to 1; or a remaining tolerable delay for SL data transmission by the first device. Upon receiving the first signaling, the second device determines the resource set according to the content indicated by the first signaling and transmits the resource set to the first device.

Exemplarily, if the first signaling indicates the M resources selected by the first device, the M resources may be M resources indicated by the first device via a PSSCH or a PSCCH. The second device determines the resource set according to the content indicated by the first signaling as follows. The second device determines a resource suitable or unsuitable SL transmission by the first device from the M resources according to the M resources indicated in the first signaling.

Exemplarily, the second device determines the resource set according to the first signaling as follows. A resource suitable or unsuitable SL transmission by the first device is determined in a predefined time period after the first time unit. A resource suitable or unsuitable SL transmission by the first device is determined from M resources according to the M resources indicated in the first signaling. That is, if the second device transmits the resource set to the first device in the first time unit, the resource set includes two parts, a first part indicates a resource suitable or unsuitable SL transmission by the first device among the M resources indicated in the first signaling, and a second part indicates a resource suitable or unsuitable SL transmission by the first device in the predefined time period after the first time unit. For example, the first time unit is slot m, the predefined time period after the first time unit may be [m+T0, m+PDB] or [m+T0, m+Δ] in above implementations, which is as described above and will not be repeated herein.

Based on above implementations where the second device determines the resource set according to the first signaling, the resource set transmitted by the second device to the first device is summarized as follows.

Resources in the resource set can be selected from the following.

(1) A time-frequency resource in a predefined time period after the second device transmits the resource set.

(2) A resource already reserved by the first device via a signaling, such as a resource reserved by the first device via a PSCCH for retransmission of the same transport block (TB) or for new transmission or retransmission of another new TB.

(3) A resource preselected by the first device but not yet reserved via a signaling.

It should be noted that, a TB may be retransmitted up to 32 times and the first device can reserve resources for up to 150 periods if the first device supports periodic resource reservation, but the first device can only reserve up to two resources in a signaling, one resource for retransmission of the same TB, and the other resource for transmission of a new TB in a next period. Therefore, there are resources that the first device has preselected in advance but are not yet reserved via a signaling.

(4) A resource that has been used by the first device, e.g., a resource that has been used by the first device in a past period.

Step 903. The first device selects a resource for SL transmission according to the resource set.

In implementations of the disclosure, if the resource set includes a resource unsuitable SL transmission by the first device, the first device may exclude the resource during resource selection.

In implementations of the disclosure, if the resource set includes a resource suitable SL transmission by the first device, the first device may preferentially select the resource during resource selection.

In implementations of the disclosure, if the resource set includes A resources unsuitable SL transmission by the first device, and B resources among the A resources are also included in M resources indicated by the first signaling, where $1 \leq B \leq A$ and $B \leq M$, the first device may reselect B resources, i.e., select different resources to replace the original B resources. During resource reselection, the first device needs to exclude the A resources.

According to the method for resource selection provided in implementations, the first device transmits the first signaling to the second device, the first signaling is used to trigger the second device to transmit the resource set to the first device, the second device feeds back the resource set to the first device according to the first signaling, and the resource set is used to assist the first device in SL transmission resource selection. In the above process, based on the trigger by the first device, the second device transmits the resource set to the first device, which can avoid that the first device is in the sleep state when the resource set is transmitted, thereby improving the reliability of SL communication data transmission.

In above implementations, the first device is configured with DRX, the first device transmits a trigger signaling to the second device to notify the second device to feed back the resource set, which can solve the problem that when the second device transmits the resource set to the first device, the first device may be in the sleep state and cannot successfully receive the resource set.

Based on above implementations, if the second device is also configured with DRX, there is a case where the first device transmits the trigger signaling to the second device, and the second device is in the sleep state and thus cannot receive the trigger signaling. Therefore, how to determine a resource for the first device to transmits the trigger signaling to the second device is a problem to be solved.

In view of the above problem, implementations of the disclosure provide a method for resource selection. Considering that the second device is configured with DRX and will receive a trigger signaling only in the DRX active time, to improve the success rate of transmission of the trigger signaling, the first device needs to first determine a time-frequency resource for transmitting the trigger signaling, and then transmit the trigger signaling to the second device on the determined time-frequency resource, which ensures that the second device can successfully receive the signaling and feed back the resource set to the first device according to the signaling SL transmission by the first device resource selection, thereby improving the transmission performance of the entire SL system.

Figure 10:
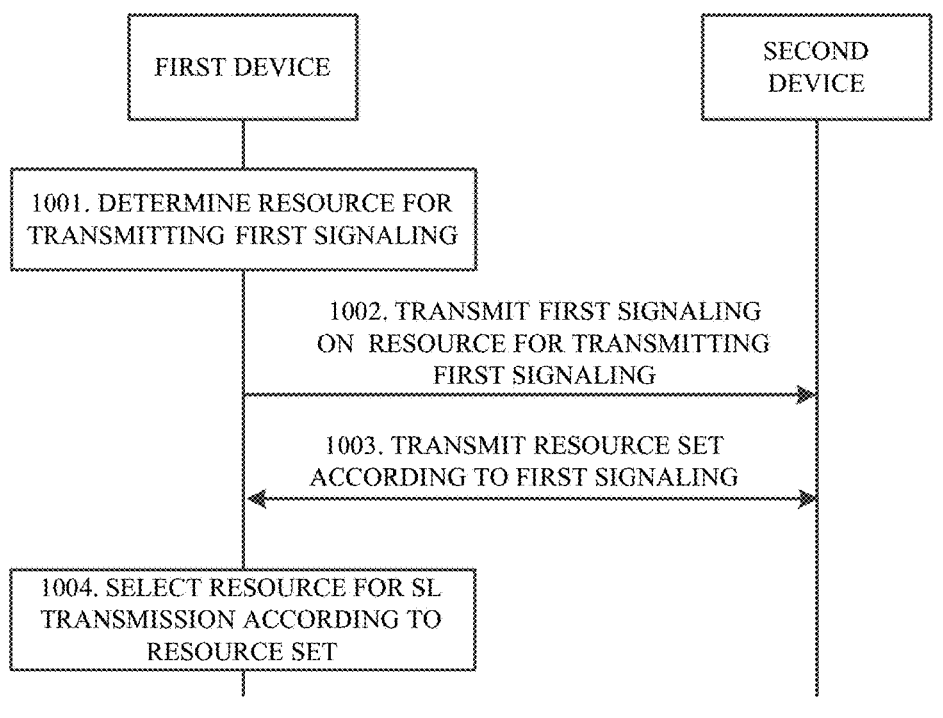
FIG. 10 is an interactive schematic diagram illustrating another method for resource selection provided in implementations of the disclosure.

The technical solutions provided in implementations of the disclosure are described in detail below with specific implementations. Exemplarily, FIG. 10 is an interactive schematic diagram illustrating another method for resource selection provided in implementations of the disclosure. As illustrated in FIG. 10, the method for resource selection in implementations includes the following steps.

Step 1001. The first device determines a resource for transmitting a first signaling.

The first signaling is used to trigger the second device to transmit a resource set to the first device, and the resource set is used to assist the first device in SL transmission resource selection.

In a first implementation of this step, the first device obtains an SL DRX configuration of the second device in advance, and determines a DRX active time for the second device according to the SL DRX configuration of the second device, so as to determine a time to transmit the first signaling. That is, the time to transmit the first signaling is in the DRX active time for the second device, thereby ensuring that the second device can successfully receive the first signaling.

In a second implementation of this step, the first device determines a resource in an SL grant in the DRX active time for the second device as a resource for transmitting the first signaling. That is, the first device may transmit the first signaling in an existing resource in the SL grant in the DRX active time for the second device. If there is no compliant resource or compliant resources are insufficient, the first device needs to perform resource reselection and transmit the first signaling on a reselected resource.

In this implementation, the first device can determine to perform resource reselection at a future time unit, such as slot n. In this case, if the first device has an SL grant and one or more resources in the SL grant of the first device are in the DRX active time for the second device, the first device may transmit the first signaling in the one or more resources in the existing SL grant in the DRX active time for the second device. If no resource in the existing SL grant of the first device is in the DRX active time for the second device, or if resources in the existing SL grant in the DRX active time for the second device are insufficient, the first device needs to trigger resource reselection. In this case, a resource selection window determined by the first device during resource reselection should be in the DRX active time for the second device.

In a specific example, when the first device satisfies at least case 2 of (1) in the above predefined condition, the first device can determine to perform resource reselection in slot n after a next MAC PDU transmission is completed. In this case, the first device may transmit the first signaling in a resource in the existing SL grant or a reselected resource during a next MAC PDU transmission. Specifically, if among existing resources of the first terminal for the next MAC PDU transmission, the number of resources that overlap with the DRX active time for the second device and whose distance with slot n is not less than T is not less than M, the first device selects M resources from these resources and transmits the first signaling to the second device on the M resources. If among the existing resources of the first terminal for the next MAC PDU transmission, the number of resources that overlap with the DRX active time for the second device and whose distance with slot n is not less than T is less than M, the first device will trigger resource reselection. M indicates the number of times the first signaling is transmitted, and the value of M may be configured or pre-configured by the base station, or defined in standards. T indicates a minimum time required for the second device to decode the first signaling, determine the resource set according to the first signaling, and transmit the resource set to the first device, and the value of T may be configured or pre-configured by the base station, or defined in standards. The value of T may be associated with a data priority (i.e., prio_TX) indicated by the first device in the first signaling.

Optionally, in some implementations, when the first device satisfies at least case 2 of (1) of the above predefined condition, the first device can transmit the first signaling only when at least one of (2), (3), and (4) of the above predefined condition is also satisfied.

In the above example, the DRX active time for the second device includes the on duration in one or more DRX configurations semi-statically configured by the second device, and a time range from activation to deactivation of a timer activated at the second device by the first device via an SL transmission that has been transmitted or is to be transmitted to the second device.

Figure 11:
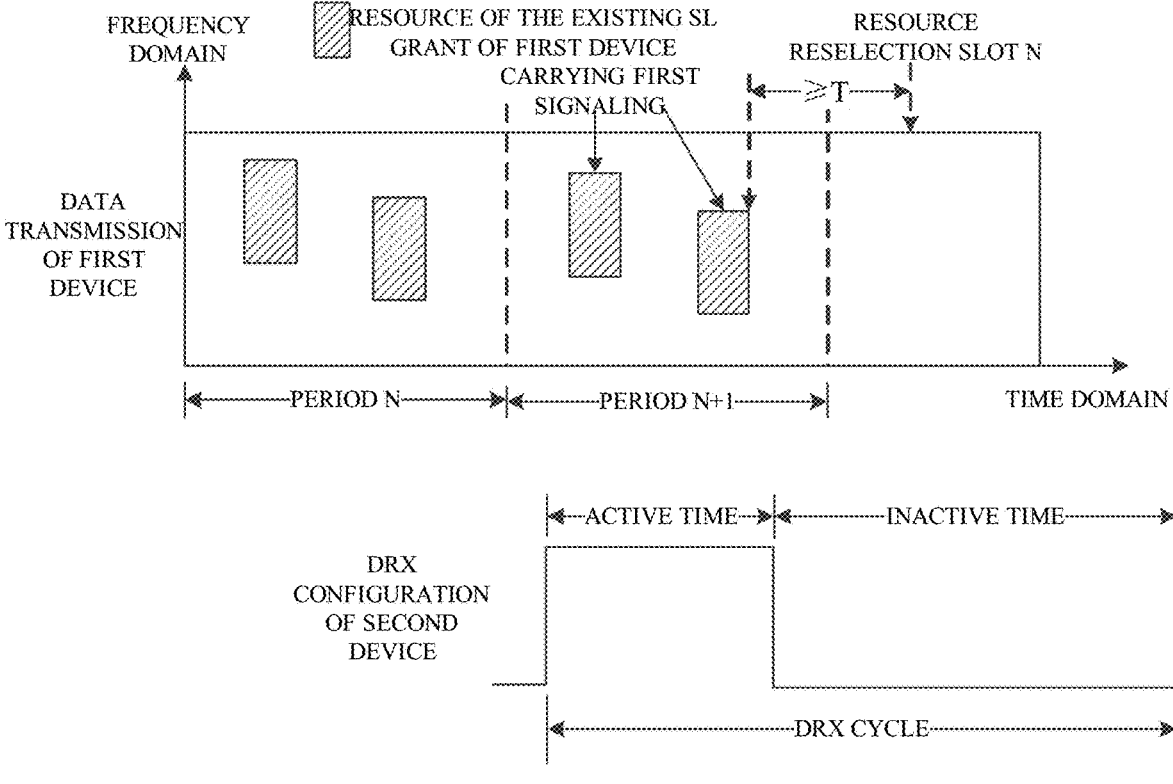
FIG. 11 is a first schematic diagram illustrating a first signaling provided in implementations of the disclosure.

Exemplary, FIG. 11 is a first schematic diagram illustrating a first signaling provided in implementations of the disclosure. In this example, the number of transmissions M of the first signaling is 2. In period n+1, there are two resources in the existing SL grant of the first device, the two resources are both in the DRX active time for the second device, and a distance between each of the two resources and slot n is not less than T. The first device transmits the first signaling for the second device in the two resources.

Figure 12:
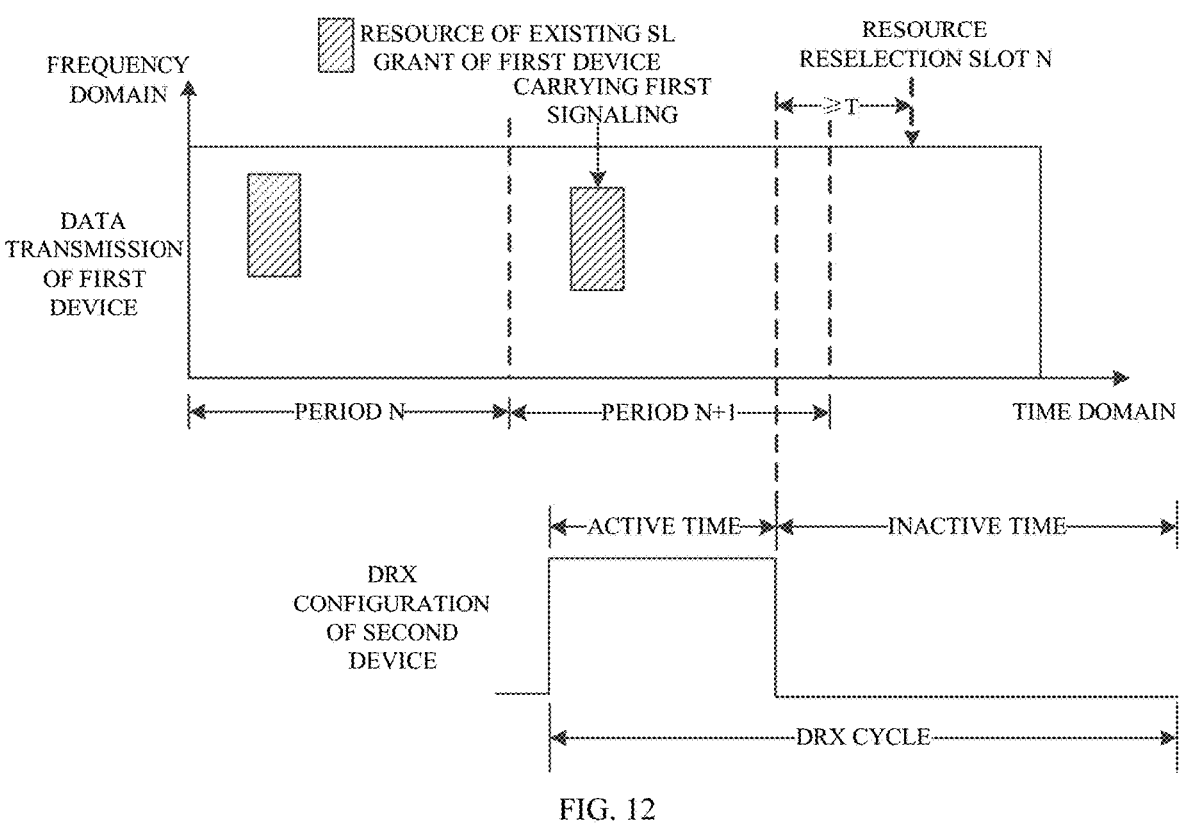
FIG. 12 is a second schematic diagram illustrating a first signaling provided in implementations of the disclosure.

Exemplary, FIG. 12 is a second schematic diagram illustrating a first signaling provided in implementations of the disclosure. In this example, the number of transmissions M of the first signaling is also 2. In period n+1, there is one resource in the existing SL grant of the first device, the resource is in the DRX active time for the second device. The first device may transmit the first signaling once in the resource. Since the first signaling needs to be transmitted twice, the first device needs to further determine a resource for transmitting the first signaling for the second time, i.e., to additionally select a resource for transmitting the first signaling for the second time. The additionally selected resource for transmitting the first signaling for the second time should overlap with the DRX active time for the second device, and an end of the resource should be no later than slot n−T.

In the above example, the first device may transmit the first signaling through a MAC CE in a PSSCH carrying a MAC PDU or through a second SCI scheduling the MAC PDU.

In the above example, the first signaling includes at least one of: a transmission resource pool of the first device; a priority prio_TX of SL data to be transmitted by the first device; a start and an end of a resource selection window for resource selection to be performed by the first device; a delay requirement of the SL data to be transmitted by the first device; a frequency-domain resource size L_subCH adopted in the resource selection to be performed by the first device; or a resource reservation period P_rsvp_TX adopted in the resource selection to be performed by the first device.

In a specific example, when the first device satisfies at least case 2 or case 3 of (1) in the above predefined condition, when there is SL data in the logical channel of the first device and resource reselection is required in slot n, if in the existing SL grant of the first device, the number of resources that overlap with the DRX active time for the second device and whose distance with slot n is not less than T is not less than M, the first device selects M resources from these resources for transmitting the first signaling to the second device. If in the existing SL grant of the first device, the number of resources that overlap with the DRX active time for the second device and whose distance with slot n is not less than T is less than M, the first device will trigger resource reselection. M and T are defined and determined in the same way as above.

Optionally, in some implementations, when the first device satisfies at least case 2 or case 3 of (1) of the above predefined condition, the first device can transmit the first signaling only when at least one of (2), (3), and (4) of the above predefined condition is also satisfied.

In the above example, the first device may transmit the first signaling through a MAC CE in a PSSCH or through a second SCI.

In the above example, the first signaling includes at least one of: a transmission resource pool of the first device; a priority prio_TX of SL data to be transmitted by the first device; a start and an end of a resource selection window for resource selection to be performed by the first device; a delay requirement of the SL data to be transmitted by the first device; a frequency-domain resource size L_subCH adopted in the resource selection to be performed by the first device; or a resource reservation period P_rsvp_TX adopted in the resource selection to be performed by the first device.

Figure 13:
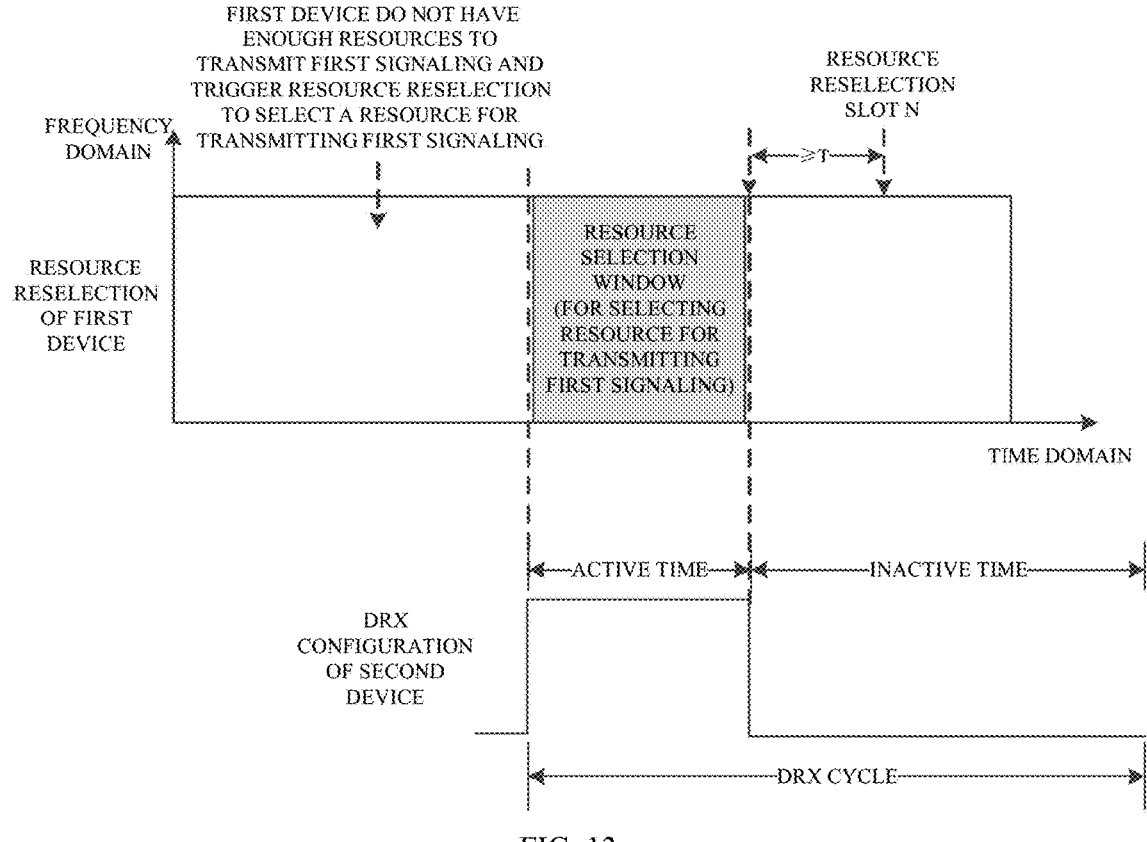
FIG. 13 is a third schematic diagram illustrating a first signaling provided in implementations of the disclosure.

Exemplarily, FIG. 13 is a third schematic diagram illustrating a first signaling provided in implementations of the disclosure. As illustrated in FIG. 13, if the first device triggers resource reselection to select a resource for transmitting the first signaling because resources for transmitting the first signaling are insufficient, an end of a resource selection window determined by the first device during resource reselection should be no later than slot n−T, and the resource selection window determined by the first device needs to overlap with the DRX active time for the second device. Optionally, a priority adopted in resource exclusion by the first device (i.e., a priority of the first signaling) is the same as a priority of data to be transmitted by the first device (i.e., prio_TX).

In a third implementation of this step, the first device randomly selects a resource for transmitting the first signaling from a resource pool in the DRX active time for the second device.

In this implementation, when the first device triggers resource reselection, there is no SL grant resource, and the first device may randomly select a resource for transmitting the first signaling from the DRX active time for the second device.

In a specific example, when the first device satisfies the first device having triggered resource reselection in (1) of the above predefined condition and (2) of the above predefined condition, or when the first device satisfies the first device having triggered resource reselection in (1) of the above predefined condition and (3) of the above predefined condition, or when the first device satisfies (3) of the above predefined condition, if the first device currently has a special resource pool (exceptional resource) configuration or any resource pool configuration that allows random resource selection, the first device can randomly select a resource for transmitting the first signaling from a part of the special resource pool overlapping with the DRX active time for the second device.

Optionally, in some implementations, when the first device satisfies the first device having triggered resource reselection in (1) of the above predefined condition and (2) of the above predefined condition, or when the first device satisfies the first device having triggered resource reselection in (1) of the above predefined condition and (3) of the above predefined condition, the first device can transmit the first signaling only when (4) in the above predefined condition is also satisfied.

In the above example, the first device may transmit the first signaling through a MAC CE in a PSSCH or through a second SCI.

In the above example, the first signaling includes at least one of: a transmission resource pool of the first device; a priority prio_TX of SL data to be transmitted by the first device; a start and an end of a resource selection window for resource selection to be performed by the first device; a delay requirement of the SL data to be transmitted by the first device; a frequency-domain resource size L_subCH adopted in the resource selection to be performed by the first device; or a resource reservation period P_rsvp_TX adopted in the resource selection to be performed by the first device.

In the above example, the DRX active time for the second device includes the on duration in one or more DRX configurations semi-statically configured by the second device, and a time range from activation to deactivation of a timer activated at the second device by the first device via an SL transmission that has been transmitted or is to be transmitted to the second device.

In this implementation, the resource for transmitting the first signaling can be randomly selected from a resource pool in the DRX active time for the second device at a MAC layer or a physical layer of the first device.

If the random selection is performed at the MAC layer of the first device, the MAC layer of the first device needs to select the resource for transmitting the first signaling in a time range in [TM1, TM2] that overlaps with the DRX active time for the second device. The value of TM1 can be selected autonomously by the first device, or TM1<=n+Tproc, where n is a time at which the first device triggers resource selection. The value of Tproc is configured or pre-configured by the network, or defined in standards. TM1 indicates a maximum processing time required by the first device from the trigger of resource selection to the transmission of the first signaling. The value of TM2 can be selected autonomously by the first device, or TM2<=X %×PDB, where PDB is a remaining tolerable delay of data to be transmitted by the first device. The value of X is configured or pre-configured by the network, or defined in standards.

If the random selection is performed at the physical layer of the first device, the MAC layer of the first device needs to provide the physical layer with a special resource pool configuration, a selection window-upper limit reference, a size of a frequency-domain resource required to transmit the first signaling, etc. The physical layer of the first device needs to select the resource for transmitting the first signaling in a time range in [TP1, TP2] that overlaps with the DRX active time for the second device. The value of TP1 can be selected autonomously by the first device, or TP1<=n+Tproc, where n is a time at which the first device triggers resource selection. The value of Tproc is configured or pre-configured by the network, or defined in standards. TP1 indicates a maximum processing time required by the first device from the trigger of resource selection to the transmission of the first signaling. The value of TP2 is determined at the physical layer of the first device according to the selection window-upper limit reference. For example, if the selection window-upper limit reference is PDB, TP2<=X %×PDB, where PDB is a remaining tolerable delay of data to be transmitted by the first device. The value of X is configured or pre-configured by the network, or defined in standards, or selected by the first device from a time range in [TP2_min, selection window-upper limit reference] that overlaps with the DRX active time for the second device. The value of TP2_min is configured or pre-configured by the network, or defined in standards. The selection window-upper limit reference is a transmission delay requirement of the first signaling indicated by the MAC layer of the first device.

In a fourth implementation of this step, the first device determines a resource obtained through resource reselection of the first device as the resource for transmitting the first signaling. That is, the first device transmits the first signaling in the resource obtained through the resource reselection.

In this implementation, after performing the resource reselection, the first device transmits the first signaling in first N resources selected, where N>=1 and the specific value of N is configured or pre-configured by the network, or defined in standards.

Figure 14:
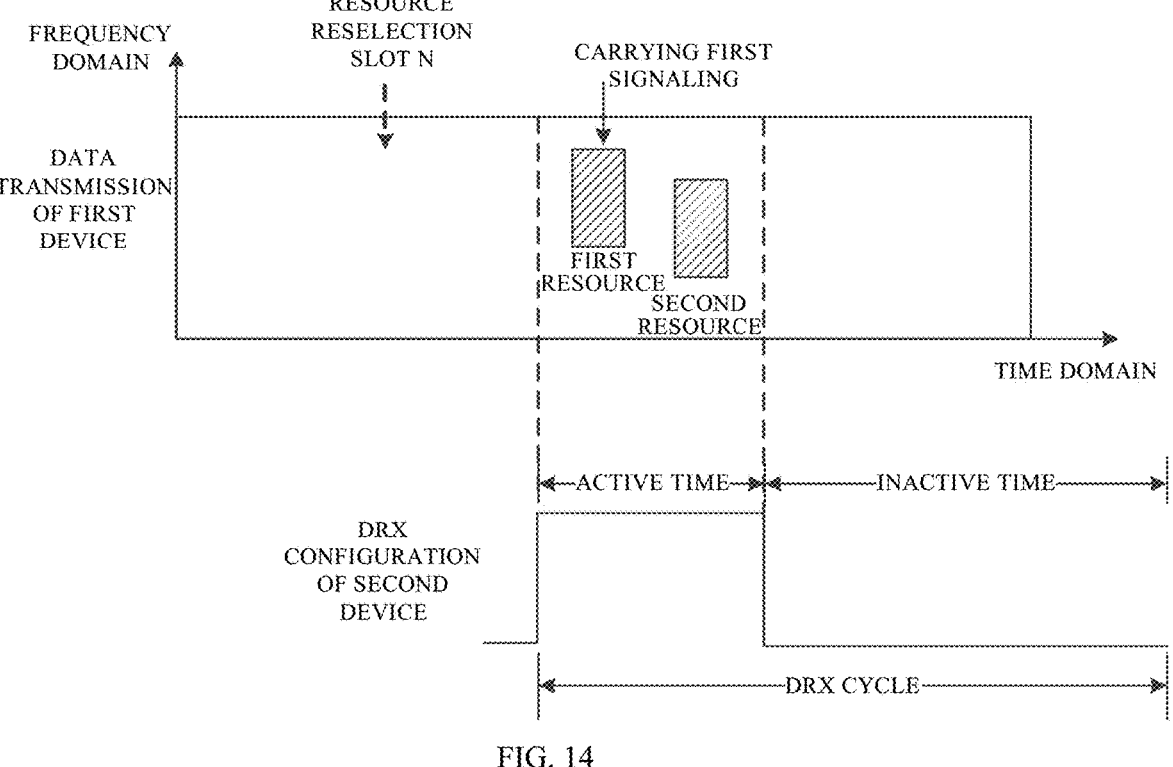
FIG. 14 is a fourth schematic diagram illustrating a first signaling provided in implementations of the disclosure.

In a specific example, after triggering the resource reselection, the first device may transmit the first signaling in at least one PSSCH resource selected for transmitting a first TB after the resource reselection. Exemplarily, FIG. 14 is a fourth schematic diagram illustrating a first signaling provided in implementations of the disclosure. As illustrated in FIG. 14, the first device performs the resource reselection in slot n. M resources are reselected during the resource reselection. For example, the value of M is 2, and the first device may transmit the first signaling in a first PSSCH resource in the M resources reselected during the resource reselection.

In the above example, the first device may transmit the first signaling through a MAC CE in a PSSCH or through a second SCI.

In the above example, the first signaling includes at least one of: a transmission resource pool of the first device; M resources selected by the first device, where M is a positive integer greater than or equal to 1; or a remaining tolerable delay for SL data transmission by the first device. The value of M is not greater than the number of resources currently selected by the first device. The value of M may be determined by the first device autonomously or defined in standards. For example, the first signaling may contain all resources selected by the first device but not yet indicated in a PSCCH.

In a specific example, after triggering the resource reselection, the first device may transmit the first signaling in at least one PSCCH resource selected for scheduling transmission of a first TB after the resource reselection. As illustrated in FIG. 14, the first device may transmit the first signaling in a first PSCCH resource in the M resources reselected during the resource reselection.

In the above example, the first device may transmit the first signaling via one or more reserved bits in PSCCH format 1-A.

Optionally, in some implementations, if the second device is configured with DRX, the resource selected by the first device for transmitting data to the second device during the resource reselection should be in the DRX active time for the second device. That is, a resource in the DRX active time for the second device after the resource reselection of the first device is determined as the resource for transmitting the first signaling. The DRX active time for the second device includes the on duration in one or more DRX configurations semi-statically configured by the second device, and a time range from activation to deactivation of a timer activated at the second device by the first device via an SL transmission that has been transmitted or is to be transmitted to the second device.

In a specific example, if the first device is configured with DRX and the first device may transmit the first signaling in a first resource selected after triggering the resource reselection, if M resources are indicated in the first signaling, the first device needs to remain in a DRX active state in a time range before the first resource among the M resources. Exemplarily, if the first resource among the M resources indicated in the first signaling is in slot r, the first device needs to remain in the DRX active state in slot [r-T3-k, r-T3]. For example, the first device starts a timer drx_inactiveTimer in slot r-T3-k, and the timer runs until slot r-T3. The first device remains in the DRX active state in slot [r-T3-k, r-T3] so as to receive the resource set fed back by the second device. T3 indicates a minimum time required for the first device to receive the resource set transmitted by the second device and reselect based on one or more resources indicated in the resource set. The value of T3 may be configured or pre-configured by the base station, or defined in standards. k is a specific time span. The value of k may be configured or pre-configured by the base station, or defined in standards.

Step 1002. The first device transmits the first signaling to the second device on the resource for transmitting the first signaling.

Step 1003. The second device transmits a resource set to the first device according to the first signaling.

Step 1004. The first device selects a resource for SL transmission according to the resource set.

Steps 1003 and 1004 in implementations are the same as steps 902 and 903 in above implementations, and details may refer to above implementations and will not be repeated herein.

The second device in implementations has an SL DRX configuration. The SL DRX configuration of the second device includes a first DRX configuration on a SL between the second device and the first device and other DRX configurations on SLs between the second device and other devices. The first DRX configuration may be configured by the network side or determined through negotiation between the second device and the first device. The other DRX configurations may be configured by the network side or determined through negotiation between the second device and other devices. The DRX active time for the second device includes a DRX active time determined by the second device according to the first DRX configuration and a DRX active time determined by the second device according to one or more other DRX configurations.

According to the method for resource selection provided in implementations, the first device first determines the time-frequency resource for transmitting the first signaling to the second device, and then transmits the first signaling to the second device on the determined time-frequency resource. The second device feeds back the resource set to the first device according to the first signaling, where the resource set is used to assist the first device in SL transmission resource selection. In the above process, the first device determines the time-frequency resource for transmitting the first signaling, which can ensure that the second device can successfully receive the first signaling, and can avoid that the second device is in the sleep state when the first signaling is transmitted, thereby improving the reliability of SL communication data transmission.

Figure 15:
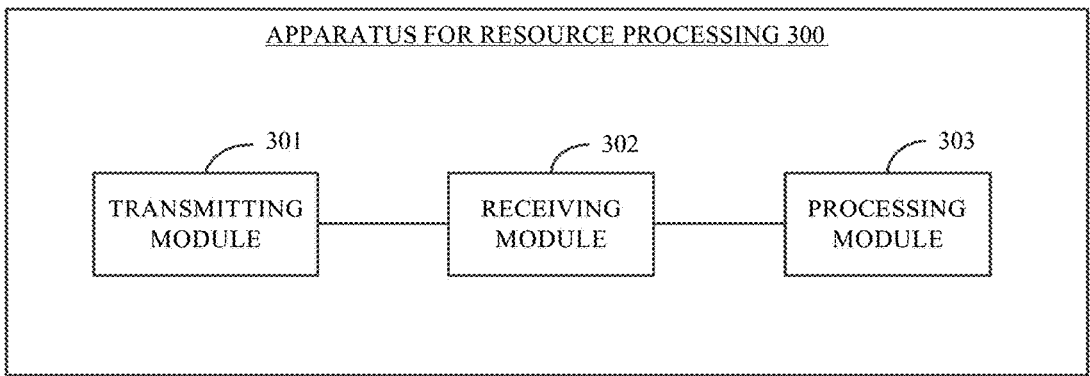
FIG. 15 is a first schematic structural diagram of an apparatus for resource selection provided in implementations of the disclosure.

Exemplarily, FIG. 15 is a first schematic structural diagram of an apparatus for resource selection provided in implementations of the disclosure. As illustrated in FIG. 15, the apparatus for resource selection 300 provided in implementations includes a transmitting module 301, a receiving module 302, and a processing module 303.

The transmitting module 301 is configured to transmit a first signaling to a second device, where the first signaling is used to trigger the second device to transmit a resource set to the first device, and the resource set is used to assist the first device in SL transmission resource selection. The receiving module 302 is configured to receive the resource set from the second device. The processing module 303 is configured to select a resource for SL transmission according to the resource set.

In implementations of the disclosure, a transmission time of the first signaling is in a DRX active time for the second device.

Optionally, the resource set includes a resource suitable or unsuitable SL transmission by the first device.

In implementations of the disclosure, before the transmitting module 301 transmits the first signaling to the second device, the processing module 303 is further configured to: determine a resource for transmitting the first signaling.

In implementations of the disclosure, the processing module 303 is specifically configured to: determine a resource in an SL grant in a DRX active time for the second device as the resource for transmitting the first signaling.

In implementations of the disclosure, if resources in the SL grant in the DRX active time for the second device are insufficient, the processing module 303 is further configured to: trigger resource reselection.

In implementations of the disclosure, the processing module 303 is specifically configured to: select the resource for transmitting the first signaling from a resource pool randomly in a DRX active time for the second device.

In implementations of the disclosure, the processing module 303 is specifically configured to: determine a resource obtained through resource reselection of the first device as the resource for transmitting the first signaling.

In implementations of the disclosure, the processing module 303 is specifically configured to: determine a resource in a DRX active time for the second device after the resource reselection of the first device as the resource for transmitting the first signaling.

In implementations of the disclosure, the processing module 303 is specifically configured to: determine at least one PSSCH resource for transmitting a first TB after the resource reselection of the first device as the resource for transmitting the first signaling.

In implementations of the disclosure, the processing module 303 is specifically configured to: determine at least one PSCCH resource for scheduling transmission of a first TB after the resource reselection of the first device as the resource for transmitting the first signaling.

Optionally, the first signaling includes at least one of: a transmission resource pool of the first device; a priority prio_TX of SL data to be transmitted by the first device; a start and an end of a resource selection window for resource selection to be performed by the first device; a delay requirement of the SL data to be transmitted by the first device; a frequency-domain resource size L_subCH adopted in the resource selection to be performed by the first device; or a resource reservation period P_rsvp_TX adopted in the resource selection to be performed by the first device.

Optionally, the first signaling includes at least one of: a transmission resource pool of the first device; M resources selected by the first device, where M is a positive integer greater than or equal to 1; or a remaining tolerable delay for SL data transmission by the first device.

In implementations of the disclosure, the transmitting module 301 is specifically configured to: transmit the first signaling to the second device when a predefined condition is satisfied, where the predefined condition includes at least one of: the first device having triggered or being about to trigger resource reselection; a priority of SL data to be transmitted by the first device being greater than a priority threshold; the first device determining that a number of consecutive reception failures of a PSSCH by the second device from the first device is greater than a predefined number; or a delay of the SL data to be transmitted by the first device being greater than a delay threshold.

In implementations of the disclosure, the first signaling is carried in a specific bit field of a PSCCH, a MAC CE in a PSSCH, a second SCI, or a PC5 RRC.

The apparatus for resource selection provided in implementations of the disclosure is configured to perform the technical solution performed by the first device in foregoing method implementations and has similar implementation principles and technical effects, which will not be repeated herein.

Figure 16:
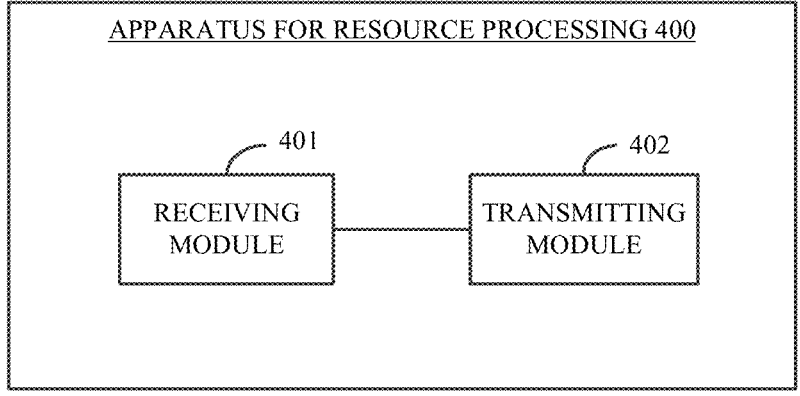
FIG. 16 is a second schematic structural diagram of an apparatus for resource selection provided in implementations of the disclosure.

Exemplarily, FIG. 16 is a second schematic structural diagram of an apparatus for resource selection provided in implementations of the disclosure. As illustrated in FIG. 16, the apparatus for resource selection 400 provided in implementations includes a receiving module 401 and a transmitting module 402.

The receiving module 401 is configured to receive a first signaling from a first device in a DRX active time, where the first signaling is used to trigger the second device to transmit a resource set to the first device, and the resource set is used to assist the first device in SL transmission resource selection. The transmitting module 402 is configured to transmit the resource set to the first device according to the first signaling.

Optionally, the resource set includes a resource suitable or unsuitable SL transmission by the first device.

Figure 17:
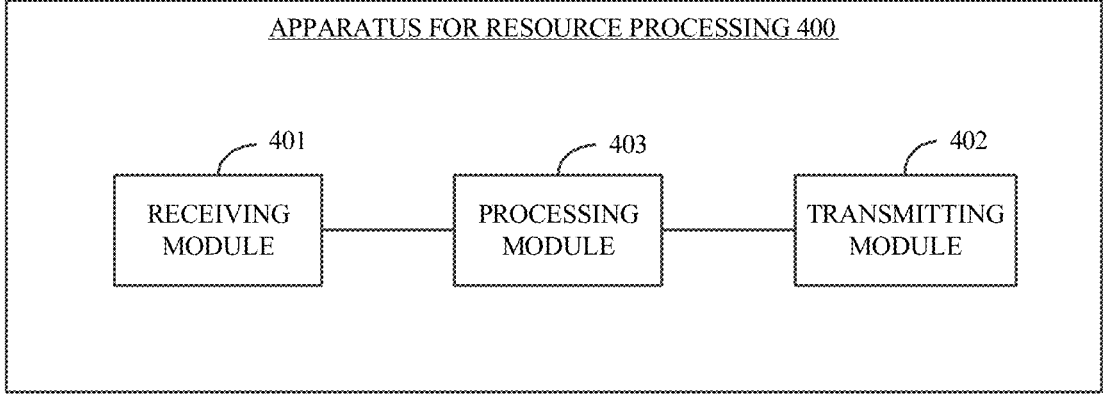
FIG. 17 is a third schematic structural diagram of an apparatus for resource selection provided in implementations of the disclosure.

FIG. 17 is a third schematic structural diagram of an apparatus for resource selection provided in implementations of the disclosure. On the basis of the apparatus illustrated in FIG. 16, as illustrated in FIG. 17, the apparatus for resource selection 400 further includes a processing module 403.

In implementations of the disclosure, the processing module 403 is configured to: determine the resource set according to the first signaling before the transmitting module 402 transmits the resource set to the first device according to the first signaling.

Optionally, the first signaling includes at least one of: a transmission resource pool of the first device; a priority prio_TX of SL data to be transmitted by the first device; a start and an end of a resource selection window for resource selection to be performed by the first device; a delay requirement of the SL data to be transmitted by the first device; a frequency-domain resource size L_subCH adopted in the resource selection to be performed by the first device; or a resource reservation period P_rsvp_TX adopted in the resource selection to be performed by the first device.

In implementations of the disclosure, the processing module 403 is specifically configured to: determine a resource suitable or unsuitable SL transmission by the first device in the resource selection window according to the resource selection window indicated in the first signaling.

Optionally, the first signaling includes at least one of: a transmission resource pool of the first device; M resources selected by the first device, where M is a positive integer greater than or equal to 1; or a remaining tolerable delay for SL data transmission by the first device.

In implementations of the disclosure, the processing module 403 is specifically configured to: determine a resource suitable or unsuitable SL transmission by the first device from the M resources according to the M resources indicated in the first signaling.

In implementations of the disclosure, the transmitting module 402 is specifically configured to: transmit the resource set to the first device in a first time unit. Accordingly, the processing module 403 is specifically configured to: determine a resource suitable or unsuitable SL transmission by the first device in a predefined time period after the first time unit.

In implementations of the disclosure, the transmitting module 402 is specifically configured to: transmit the resource set to the first device in a first time unit. Accordingly, the processing module 403 is specifically configured to: determine a resource suitable or unsuitable SL transmission by the first device in a predefined time period after the first time unit; and determine a resource suitable or unsuitable SL transmission by the first device from M resources according to the M resources indicated in the first signaling.

The apparatus for resource selection provided in implementations of the disclosure is configured to perform the technical solution performed by the second device in foregoing method implementations and has similar implementation principles and technical effects, which will not be repeated herein.

It should be noted that, it should be understood that division of modules of any apparatus for resource selection above is merely a logical functional division. The modules may be all or partially integrated in a physical entity or may be physically separated in an actual implementation. In addition, the modules may be all implemented in a form of software invoked by a processing component, or may be all implemented in a form of hardware; or a part of the modules may be implemented in a form of software invoked by a processing component, and another part of modules may be implemented in a form of hardware. For example, the processing module may be a processing component separately disposed, or may be integrated in a chip of the apparatus for implementation. In addition, the determining module may be stored in the memory of the apparatus in a form of program codes, and is invoked by a processing component of the apparatus to perform a function of the determining module. Implementation of other modules is similar to this. In addition, the modules may be all or partially integrated, or may be implemented independently. The processing component described herein may be an integrated circuit with a signal processing capability. In implementation, steps in foregoing methods or modules may be implemented by a hardware integrated logic circuit in the processing component or by instructions in a form of software.

For example, the modules may be configured as one or more integrated circuits for implementing foregoing methods, for example, one or more application specific integrated circuits (ASIC), or one or more digital signal processors (DSP), one or more field programmable gate arrays (FPGA), etc. For another example, when one of the foregoing modules is implemented in a form of program codes invoked by a processing component, the processing component may be a general-purpose processor, for example, a central processing unit (CPU) or other processors that may invoke program codes. For another example, the modules may be integrated together and implemented in a form of a system-on-a-chip (SOC).

The functions in implementations described above may be implemented in whole or in part through software, hardware, firmware, or any combination thereof. When implemented through software, the functions may be implemented in whole or in part in a form of a computer program product. The computer program product includes one or more computer instructions. When the computer program instructions are loaded and executed on a computer, processes or functions are generated in whole or in part according to implementations of the disclosure. The computer may be a general-purpose computer, a special purpose computer, a computer network, or another programmable apparatus. The computer instructions may be stored in a computer-readable storage medium, or may be transmitted from one computer-readable storage medium to another computer-readable storage medium. For example, the computer instructions may be transmitted from a website site, a computer, a server, or a data center to another website site, computer, server, or data center through a wired mode (e.g., a coaxial cable, an optical fiber, and a digital subscriber line (DSL)) or a wireless mode (e.g., infrared radiation, radio, and microwave). The computer-readable storage medium may be any available medium which a computer may access to, or a data storage device such as a server or data center that includes one or more available media integrated therein. The available medium may be a magnetic medium (e.g., a floppy disk, a hard disk, and a magnetic tape), an optical medium (e.g., a digital video disc (DVD)), or a semiconductor medium (e.g., a solid state disk (SSD)), or the like.

Figure 18:
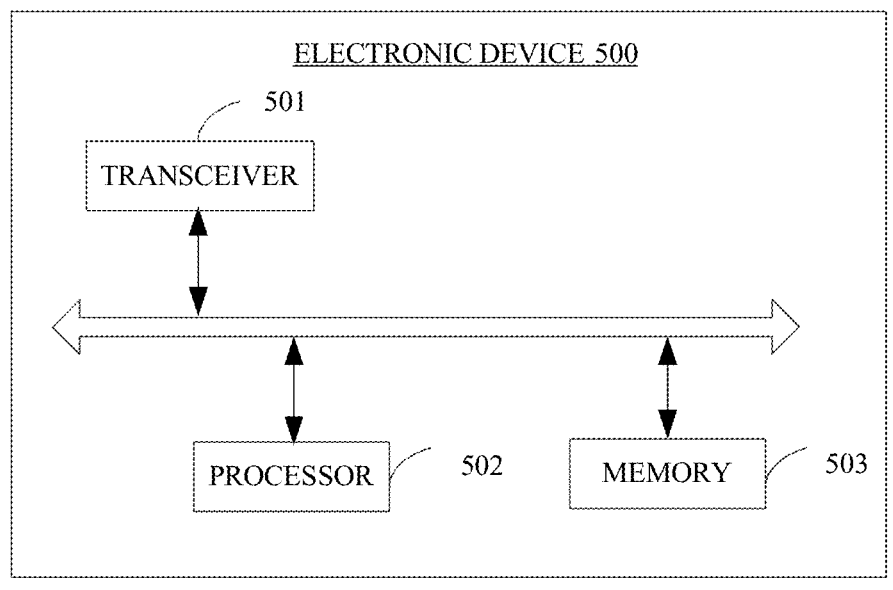
FIG. 18 is a first schematic diagram illustrating a hardware structure of an electronic device provided in implementations of the disclosure.

FIG. 18 is a first schematic diagram illustrating a hardware structure of an electronic device provided in implementations of the disclosure. As illustrated in FIG. 18, the electronic device 500 provided in implementations may include: a transceiver 501, a processor 502, and a memory 503. The memory 503 is configured to store computer-executable instructions. The processor 502 is configured to execute the computer-executable instructions stored in the memory 503 to perform the technical solution of the first device in any foregoing method implementation.

Optionally, the memory 503 may be independent or integrated with the processor 502. When the memory 503 is a device independent of the processor 502, the electronic device 500 may further include a bus 504 configured to connect the memory 503 and the processor 502.

Optionally, the processor 502 may be a chip.

Figure 19:
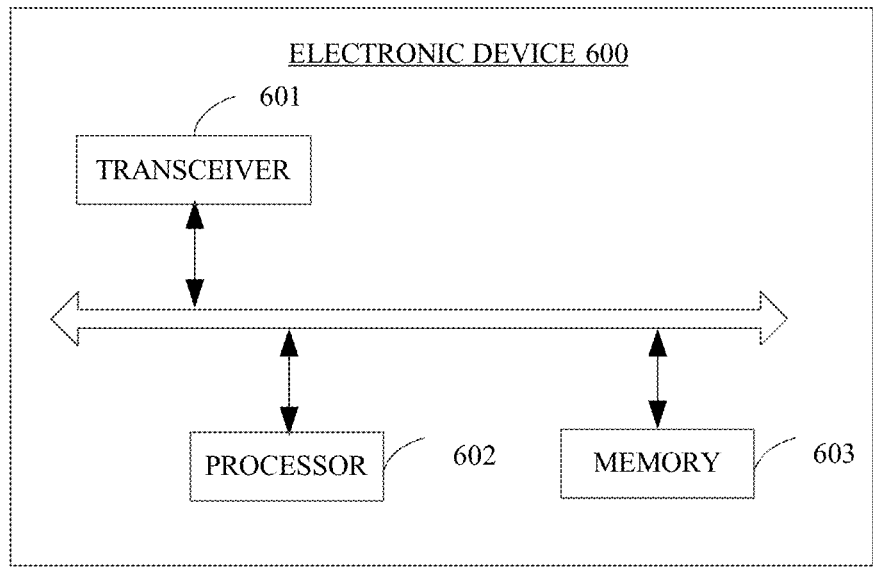
FIG. 19 is a second schematic diagram illustrating a hardware structure of an electronic device provided in implementations of the disclosure.

FIG. 19 is a second schematic diagram illustrating a hardware structure of an electronic device provided in implementations of the disclosure. As illustrated in FIG. 19, the electronic device 600 provided in implementations may include: a transceiver 601, a processor 602, and a memory 603. The memory 603 is configured to store computer-executable instructions. The processor 602 is configured to execute the computer-executable instructions stored in the memory 603 to perform the technical solution of the second device in any foregoing method implementation.

Optionally, the memory 603 may be independent or integrated with the processor 602. When the memory 603 is a device independent of the processor 602, the electronic device 600 may further include a bus 604 configured to connect the memory 603 and the processor 602.

Optionally, the processor 602 may be a chip.

Implementations of the disclosure further provide a computer readable storage medium. The computer readable storage medium stores computer-executable instructions. The computer-executable instructions are operable with a processor to implement the technical solution of the first device in any foregoing method implementation.

Implementations of the disclosure further provide a computer readable storage medium. The computer readable storage medium stores computer-executable instructions. The computer-executable instructions are operable with a processor to implement the technical solution of the second device in any foregoing method implementation.

Implementations of the disclosure further provide a computer program. The computer program is operable with a processor to perform the technical solution of the first device in any foregoing method implementation.

Implementations of the disclosure further provide a computer program. The computer program is operable with a processor to perform the technical solution of the second device in any foregoing method implementation.

Implementations of the disclosure further provide a computer program product. The computer program product includes program instructions. The program instructions are configured to implement the technical solution of the first device in any foregoing method implementation.

Implementations of the disclosure further provide a computer program product. The computer program product includes program instructions. The program instructions are configured to implement the technical solution of the second device in any foregoing method implementation.

Implementations of the disclosure further provides a chip. The chip includes a processing module and a communication interface. The processing module is configured to perform the technical solution of the first device in foregoing method implementations.

Optionally, the chip further includes a storage module (e.g., a memory). The storage module is configured to store instructions. The processing module is configured to execute the instructions stored in the storage module to perform the technical solution of the first device in any foregoing method implementation.

Implementations of the disclosure further provides a chip. The chip includes a processing module and a communication interface. The processing module is configured to perform the technical solution of the second device in foregoing method implementations.

Optionally, the chip further includes a storage module (e.g., a memory). The storage module is configured to store instructions. The processing module is configured to execute the instructions stored in the storage module to perform the technical solution of the second device in any foregoing method implementation.

In the disclosure, "at least two" means two or more, and "multiple" means two or more. The term "and/or" describes an association relationship between associated objects and represents that three relationships may exist. For example, A and/or B may represent: only A exists, both A and B exist, and only B exists, where A and B can be singular or plural. The character "/" generally indicates an "or" relationship between associated objects. In a formula, the character "/" indicates a "division" relationship between associated objects. The expression "at least one of" or equivalents thereof refers to any combination of the terms, including any combination of singular terms (pieces) or plural terms (pieces). For example, at least one of a, b, or c can mean: a, b, c, a and b, a and c, b and c, or a, b, and c, where a, b, and c may be singular or plural.

It should be understood that various reference numerals involved in implementations of the disclosure are merely for convenience of description, and are not intended to limit the scope of implementations of the disclosure.

It should be understood that sizes of serial numbers of the foregoing processes do not mean execution sequences in implementations of the disclosure. The execution sequences of the processes should be determined according to functions and internal logics of the processes, and should not impose any limitation on implementation processes of implementations of the disclosure.

What is claimed is:

1. A method for resource selection, being applied to a first device and comprising:

determining a resource in a sidelink (SL) grant in a discontinuous reception (DRX) active time for a second device as a resource for transmitting a first signaling;

transmitting the first signaling to the second device, the first signaling being used to trigger the second device to transmit a resource set to the first device, and the resource set being used to assist the first device in SL transmission resource selection;

receiving the resource set from the second device; and selecting a resource for SL transmission according to the resource set.

2. The method of claim 1, wherein a transmission time of the first signaling is in the DRX active time for the second device.

3. The method of claim 1, further comprising:

triggering resource reselection if resources in the SL grant in the DRX active time for the second device are insufficient.

4. The method of claim 1, wherein determining the resource for transmitting the first signaling comprises:

selecting the resource for transmitting the first signaling from a resource pool randomly the DRX active time for the second device.

5. The method of claim 1, wherein determining the resource for transmitting the first signaling comprises:

determining a resource obtained through resource reselection of the first device as the resource for transmitting the first signaling.

6. The method of claim 5, wherein determining the resource obtained through the resource reselection of the first device as the resource for transmitting the first signaling comprises one of the following:

determining a resource in the DRX active time for the second device after the resource reselection of the first device as the resource for transmitting the first signaling;

determining at least one physical sidelink shared channel (PSSCH) resource for transmitting a first transport block (TB) after the resource reselection of the first device as the resource for transmitting the first signaling; and determining at least one physical sidelink control channel (PSCCH) resource for scheduling transmission of a first TB after the resource reselection of the first device as the resource for transmitting the first signaling.

7. The method of claim 1, wherein transmitting the first signaling to the second device comprises:

transmitting the first signaling to the second device when a predefined condition is satisfied, wherein the predefined condition comprises at least one of:

the first device having triggered or being about to trigger resource reselection;

a priority of SL data to be transmitted by the first device being greater than a priority threshold;

the first device determining that a number of consecutive reception failures of a PSSCH by the second device from the first device is greater than a predefined number; or a delay of the SL data to be transmitted by the first device being greater than a delay threshold.

8. The method of claim 1, wherein the first signaling is carried in a specific bit field of a PSCCH, a medium access control-control element (MAC CE) in a PSSCH, a second sidelink control information (SCI), or a PC5 radio resource control (RRC).

9. A method for resource selection, being applied to a second device and comprising:

receiving a first signaling from a first device in a discontinuous reception (DRX) active time for the second device, wherein a resource in a sidelink (SL) grant in the DRX active time for the second device is determined as a resource for transmitting the first signaling, the first signaling is used to trigger the second device to transmit a resource set to the first device, and the resource set is used to assist the first device in SL transmission resource selection; and transmitting the resource set to the first device according to the first signaling.

10. The method of claim 9, wherein the resource set comprises a resource suitable or unsuitable SL transmission by the first device.

11. The method of claim 9, wherein before transmitting the resource set to the first device according to the first signaling, the method further comprises:

determining the resource set according to the first signaling.

12. The method of claim 11, wherein the first signaling comprises at least one of:

a transmission resource pool of the first device;

a priority prio_TX of SL data to be transmitted by the first device;

a start and an end of a resource selection window for resource selection to be performed by the first device;

a delay requirement of the SL data to be transmitted by the first device;

a frequency-domain resource size L_subCH adopted in the resource selection to be performed by the first device; or a resource reservation period P_rsvp_TX adopted in the resource selection to be performed by the first device.

13. The method of claim 12, wherein determining the resource set according to the first signaling comprises:

determining a resource suitable or unsuitable SL transmission by the first device in the resource selection window according to the resource selection window indicated in the first signaling.

14. The method of claim 11, wherein the first signaling comprises at least one of:

a transmission resource pool of the first device;

M resources selected by the first device, wherein M is a positive integer greater than or equal to 1; or a remaining tolerable delay for SL data transmission by the first device.

15. The method of claim 14, wherein determining the resource set according to the first signaling comprises:

determining a resource suitable or unsuitable SL transmission by the first device from the M resources according to the M resources indicated in the first signaling.

16. The method of claim 11, wherein transmitting the resource set to the first device comprises:

transmitting the resource set to the first device in a first time unit, and determining the resource set according to the first signaling comprises:

determining a resource suitable or unsuitable SL transmission by the first device in a predefined time period after the first time unit.

17. The method of claim 11, wherein transmitting the resource set to the first device comprises:

transmitting the resource set to the first device in a first time unit, and determining the resource set according to the first signaling comprises:

determining a resource suitable or unsuitable SL transmission by the first device in a predefined time period after the first time unit; and determining a resource suitable or unsuitable SL transmission by the first device from M resources according to the M resources indicated in the first signaling.

18. A first device, comprising:

a processor;

and a memory configured to store computer programs;

wherein the processor is configured to invoke and execute the computer programs stored in the memory to cause the first device to:

determine a resource in a sidelink (SL) grant in a discontinuous reception (DRX) active time for a second device as a resource for transmitting a first signaling;

transmit the first signaling to the second device, the first signaling being used to trigger the second device to transmit a resource set to the first device, and the resource set being used to assist the first device in SL transmission resource selection;

receive the resource set from the second device; and select a resource for SL transmission according to the resource set.

* * * * *